(12) United States Patent
Huang

(10) Patent No.: US 8,891,177 B2
(45) Date of Patent: *Nov. 18, 2014

(54) OPTICAL IMAGING SYSTEM FOR PICKUP

(75) Inventor: Hsin-Hsuan Huang, Taichung (TW)

(73) Assignee: Largan Precision Co., Taichung (TW)

(*) Notice: Subject to any disclaimer, the term of this patent is extended or adjusted under 35 U.S.C. 154(b) by 197 days.

This patent is subject to a terminal disclaimer.

(21) Appl. No.: 13/333,139

(22) Filed: Dec. 21, 2011

(65) Prior Publication Data
US 2012/0188654 A1 Jul. 26, 2012

(30) Foreign Application Priority Data

Jun. 20, 2011 (TW) ............................. 100121391 A

(51) Int. Cl.
*G02B 3/02* (2006.01)
*G02B 13/18* (2006.01)
*G02B 9/62* (2006.01)
*G02B 13/00* (2006.01)

(52) U.S. Cl.
CPC .............. *G02B 13/0045* (2013.01); *G02B 9/62* (2013.01)
USPC ........................................ 359/713; 359/708

(58) Field of Classification Search
USPC ................................ 359/708, 713
See application file for complete search history.

(56) References Cited

U.S. PATENT DOCUMENTS

| | | | |
|---|---|---|---|
| 3,997,248 A | 12/1976 | Fujii | |
| 4,389,099 A | 6/1983 | Imai | |
| 4,550,987 A | 11/1985 | Tachihara | |
| 5,007,719 A | 4/1991 | Hasegawa | |
| 5,172,274 A | 12/1992 | Hirakawa | |
| 5,216,545 A | 6/1993 | Saito | |
| 5,513,046 A | 4/1996 | Toyama | |
| 5,636,067 A | 6/1997 | Shimizu | |
| 5,682,269 A | 10/1997 | Kimura et al. | |
| 6,101,049 A | 8/2000 | Noda | |
| 6,181,479 B1 * | 1/2001 | Koizumi | ........................ 359/645 |
| 6,366,412 B1 | 4/2002 | Noda et al. | |

(Continued)

FOREIGN PATENT DOCUMENTS

| | | |
|---|---|---|
| CN | 102819095 A | 12/2012 |
| JP | A04-051108 A | 2/1992 |

(Continued)

OTHER PUBLICATIONS

Office Action of corresponding CN application, published on May 15, 2014.

*Primary Examiner* — James Greece
(74) *Attorney, Agent, or Firm* — Wang Law Firm, Inc.; Li K. Wang; Stephen Hsu

(57) ABSTRACT

An optical imaging system for pickup, sequentially arranged from an object side to an image side, comprising: the first lens element with positive refractive power having a convex object-side surface, the second lens element with refractive power, the third lens element with refractive power, the fourth lens element with refractive power, the fifth lens element with refractive power; the sixth lens element made of plastic, the sixth lens with refractive power having a concave image-side surface with both being aspheric, and the image-side surface having at least one inflection point. By such arrangements, the optical imaging system for pickup satisfies conditions related to shorten the total length and to reduce the sensitivity for using in compact cameras and mobile phones with camera functionalities.

21 Claims, 13 Drawing Sheets

(56) References Cited

U.S. PATENT DOCUMENTS

| | | |
|---|---|---|
| 6,421,189 B1 | 7/2002 | Sensui |
| 6,449,104 B2 | 9/2002 | Takatsuki |
| 6,519,097 B2 | 2/2003 | Ohno |
| 6,650,487 B2 | 11/2003 | Mori |
| 7,054,076 B2 | 5/2006 | Tesar et al. |
| 7,253,972 B2 | 8/2007 | Fujisaki et al. |
| 7,542,219 B2 | 6/2009 | Saori |
| 7,564,634 B2 | 7/2009 | Lin et al. |
| 7,580,206 B2 | 8/2009 | Chang |
| 7,701,649 B2 | 4/2010 | Huang et al. |
| 7,787,196 B2 | 8/2010 | Asami et al. |
| 8,310,767 B2 * | 11/2012 | Huang et al. .......... 359/713 |
| 8,472,128 B2 * | 6/2013 | Huang .......... 359/713 |
| 2013/0120858 A1 * | 5/2013 | Sano .......... 359/713 |

FOREIGN PATENT DOCUMENTS

| | | |
|---|---|---|
| JP | 2007086308 A | 4/2007 |
| JP | 2007264172 A | 10/2007 |
| JP | 2007304312 A | 11/2007 |
| JP | 2008250136 A | 10/2008 |
| JP | 2009169129 A | 7/2009 |
| JP | 2010-79252 A | 4/2010 |
| JP | 2010145648 A | 7/2010 |
| JP | 2010161403 A * | 7/2010 |
| JP | 2010176015 A | 8/2010 |

* cited by examiner

OPTICAL IMAGING SYSTEM FOR PICKUP

BACKGROUND OF THE INVENTION

1. Field of the Invention

The present invention relates to an optical imaging system for pickup, and more particularly to the optical imaging system for pickup comprised of six lens elements to shorten total length and improve image quality for applying to electronic products.

2. Description of the Related Art

In compact electronic products such as digital still cameras, or mobile phone cameras, an optical imaging system for pickup is generally installed for capturing images of an object, and the optical imaging system for pickup tends to be developed with a compact design and a low cost, while meeting the user requirements for good aberration correction ability, high resolution, and high image quality.

In general, a conventional optical imaging system for pickup of a compact electronic product comes with different designs, including the two-lens, three-lens, four-lens, five-lens and six-or-more lens designs. However, if the imaging quality is taken into consideration, the optical imaging system for pickup with the four-lens, five-lens or six-lens designs has advantages on image aberration and modulation transfer function (MTF) performance, wherein the six-lens design having a higher resolution than the four-lens, or five-lens designs is suitable for electronic products requiring high quality and high pixels.

In various compact designs of the six-lens optical imaging system for pickup having a fixed focal length, prior arts adopt different combinations of positive and negative refractive powers as disclosed in U.S. Pat. Nos. 5,682,269 and 5,513,046 adopting for a group of stacked lenses. For example, the first lens element with negative refractive power and the second lens element with positive refractive power are used for shortening the total length of an optical system as disclosed in U.S. Pat. No. 7,564,634.

In products such as compact digital cameras, web cameras, and mobile phone cameras, the optical imaging system for pickup requires a compact design, a short focal length, and a good aberration correction. Wherein, the six-lens optical imaging system for pickup having a fixed focal length generally adopts the sixth lens element with positive refractive power to allow the increase of the view angle so as to reduce the total length of the optical imaging system. As disclosed in U.S. Pat. Nos. 7,701,649, 4,389,099, and 4,550,987, adopting the optical imaging systems tend to have a good aberration correction, but the total length of the optical imaging system for pickup still fails to satisfy the specifications for compact electronic devices. In addition, a combination of the fifth lens element with negative refractive power and the sixth lens element with positive refractive power is adopted, and the refractive power and the rear focal length of the optical imaging system for pickup are adjusted to avoid aberrations caused by excessive positive refractive power as disclosed in U.S. Pat. No. 3,997,248. These conventional designs must increase the rear focal length of the optical imaging system for pickup, so that the total length of the optical imaging system cannot be reduced.

Therefore, the present invention provides a more practical design to shorten the optical imaging lens assembly adopts a combination of refractive powers of six lens elements, convex and concave optical surfaces. Wherein the fifth lens element and the sixth lens element have positive refractive power and negative refractive power respectively, and this complementary combination with a telecentric effect is favorable for reducing the rear focal length and the total length of the optical imaging system for pickup effectively as well as further improving the image quality and applying the optical imaging lens assembly to compact electronic products.

SUMMARY OF THE INVENTION

Therefore, it is a primary objective of the present invention to provide an optical imaging system for pickup, sequentially arranged from an object side to an image side, comprising: the first lens element, the second lens element, the third lens element, the fourth lens element, the fifth lens element and the sixth lens element, wherein, the first lens element with positive refractive power has a convex object-side surface; the second lens element has refractive power; the third lens element has refractive power; the fourth lens element has refractive power; the fifth lens element has refractive power; the plastic sixth lens element with refractive power has a concave image-side surface, both object-side surface and image-side surface being aspheric, and the image-side surface having at least one inflection point; and the following relation is satisfied:

$$1.8 < |f/f_5| + |f/f_6| < 3.5; \quad (1)$$

wherein, f is the focal length of the optical imaging system for pickup, $f_5$ is the focal length of the fifth lens element, and $f_6$ is the focal length of the sixth lens element.

Moreover, the present invention provides an optical imaging system for pickup, as described above, made of at least three plastic lens elements and further comprising a stop and an image sensor at an image plane for imaging a photographed object, wherein the second lens element with negative refractive power has a concave image-side surface; the fifth lens element has positive refractive power; the sixth lens element with negative refractive power has a concave object-side surface; and the optical imaging system for pickup satisfies one or more of the following relations in addition to the relation (1):

$$0.7 < S_D/T_D < 1.2; \quad (2)$$

$$0.2 < (CT_3 + CT_4 + CT_5)/f < 0.4; \quad (3)$$

$$TTL/ImgH < 2.1; \quad (4)$$

$$0 < (R_7 - R_8)/(R_7 + R_8) < 0.6; \quad (5)$$

$$0 < (R_3 + R_4)/(R_3 - R_4) < 1.5; \quad (6)$$

$$2.0 < |f/f_5| + |f/f_6| < 3.2; \quad (7)$$

wherein, $S_D$ is an axial distance between the stop and the image-side surface of the sixth lens element, $T_D$ is an axial distance between the object-side surface of the first lens element and the image-side surface of the sixth lens element, $CT_3$ is a central thickness of the third lens element, $CT_4$ is a central thickness of the fourth lens element, $CT_5$ is a central thickness of the fifth lens element, TTL is an axial distance between the object-side surface of the first lens element and the image plane, ImgH is half of the diagonal length of an effective photosensitive area of the image sensor, $R_3$ is a curvature radius of the object-side surface of the second lens element, $R_4$ is a curvature radius of the image-side surface of the second lens element, $R_7$ is a curvature radius of the object-side surface of the fourth lens element, $R_8$ is a curvature radius of the image-side surface of the fourth lens element, f is a focal length of the optical imaging system for pickup, $f_5$ is a focal length of the fifth lens element, and $f_6$ is a focal length of the sixth lens element.

Moreover, the present invention provides an optical imaging system for pickup, as described above, wherein the second lens element with negative refractive power has a concave image-side surface; the fifth lens element has positive refractive power; the sixth lens element with negative refractive power has a concave object-side surface; and the optical imaging system for pickup satisfies one or more of the following relations in addition to the relation (1):

$$0.1 < Y_C/f < 0.8; \quad (12)$$

$$0.2 < R_{12}/f < 1.2; \quad (13)$$

$$0.03 < T_{12}/T_{23} < 0.3; \quad (14)$$

wherein, $Y_C$ is a vertical distance between the outermost horizontal vertex of the image side surface of the sixth lens element and the optical axis (as shown in FIG. 7), f is a focal length of the optical imaging system for pickup, $R_{12}$ is a curvature radius of the image-side surface of the sixth lens element, $T_{12}$ is an axial distance between the first lens element and the second lens element, and $T_{23}$ is an axial distance between the second lens element and the third lens element.

Moreover, the present invention provides an optical imaging system for pickup, as described above, further comprising an image sensor at an image plane for imaging an photographed object, wherein the second lens element with negative refractive power has a concave image-side surface; the fourth lens element has a concave object-side surface and a convex image-side surface; the fifth lens element has a concave object-side surface and a convex image-side surface; the sixth lens element with negative refractive power has a concave object-side surface; and the optical imaging system for pickup satisfies one or more of the following relations in addition to the relation (1):

$$1.0 < f/f_1 < 2.0; \quad (8)$$

$$25 < v_1 - v_2 < 40; \quad (9)$$

$$-0.2 < (R_{11} + R_{12})/(R_{11} - R_{12}) < 0.9; \quad (10)$$

$$3.7 \text{ mm} < TTL < 6.5 \text{ mm}; \quad (11)$$

$$TTL/ImgH < 2.1; \quad (4)$$

wherein, f is a focal length of the optical imaging system for pickup, $f_1$ is a focal length of the first lens element, $v_1$ is the Abbe number of the first lens element, $v_2$ is the Abbe number of the second lens element, $R_{11}$ is the curvature radius of the object-side surface of the sixth lens element, $R_{12}$ is the curvature radius of the image-side surface of the sixth lens element, TTL is an axial distance between the object-side surface of the first lens element and the image plane, and ImgH is half of the diagonal length of an effective photosensitive area of the image sensor.

Another objective of the present invention is to provide an optical imaging system for pickup, sequentially arranged from an object side to an image side, comprising: the first lens element, the second lens element, the third lens element, the fourth lens element, the fifth lens element and the sixth lens element, wherein the first lens element with positive refractive power has a convex object-side surface; the second lens element has refractive power; the third lens element has refractive power; the fourth lens element has refractive power; the fifth lens element has refractive power; the plastic sixth lens element with refractive power has a concave image-side surface, both object-side surface and image-side surface being aspheric, and the image-side surface having at least one inflection point; and optical imaging system for pickup satisfies the following relations:

$$1.8 < |f/f_5| + |f/f_6| < 3.5; \quad (1)$$

$$0.1 < Y_C/f < 0.8; \quad (12)$$

wherein, f is the focal length of the optical imaging system for pickup, $f_5$ is the focal length of the fifth lens element, $f_6$ is the focal length of the sixth lens element, and $Y_C$ is the vertical distance between the outermost horizontal vertex of the image side surface of the sixth lens element and the optical axis.

Moreover, the present invention provides an optical imaging system for pickup, as described above, further comprising an image plane; wherein the second lens element has a concave image-side surface; the fourth lens element has a concave object-side surface and a convex image-side surface; the fifth lens element has a concave object-side surface and a convex image-side surface; the sixth lens element has a concave object-side surface; and the optical imaging system for pickup satisfies one or more of the following relations in addition to the relations (1) and (12):

$$3.7 \text{ mm} < TTL < 6.5 \text{ mm}; \quad (11)$$

wherein, TTL is an axial distance between the object-side surface of the first lens element and the image plane.

With the arrangement of the aforementioned first lens element, second lens element, third lens element, fourth lens element, fifth lens element and sixth lens element with an appropriate interval apart from one another, the present invention can provide a good aberration correction and an advantageous modulation transfer function (MTF) in a greater field of view.

In the optical imaging system for pickup of the present invention, the first lens element with positive refractive power provides most of the refractive power required to assist reducing the total length, and the second lens element with negative refractive power can correct aberrations produced by the lens element with positive refractive power effectively and correct the Petzval sum of the system to make the image surface on the edge flatter. If the second lens element has a concave image-side surface, the intensity of negative refractive power of the second lens element can be adjusted appropriately according to the surface shape to provide a good aberration correction effect to the system. In addition, the meniscus fourth lens element and fifth lens element having a concave object-side surface and a convex image-side surface can assist the aberration correction. The curvature ratio at the periphery of the image-side surface facilitates suppressing the angle of projecting the light onto the sensor to enhance the light sensitivity of the image sensor. With the complementary fifth lens element with positive refractive power and sixth lens element with negative refractive power, the telecentric effect can be achieved to facilitate reducing the rear focal length, so as to shorten the total length.

In the optical imaging system for pickup of the present invention, the arrangement of the stop produces a longer distance between the exit pupil of the optical imaging system for pickup and the image plane so that the imaging light can be projected directly and then received by the image sensor to avoid dark corners or achieve the telecentric effect on the image side. In general, the telecentric effect can improve the brightness of the image plane and enhance the speed of receiving images by the CCD or CMOS image sensor.

In the optical imaging system for pickup of the present invention, the combination of the first lens element with positive refractive power, the second lens element with negative refractive power and the third lens element with positive or negative refractive power, and the mutual compensation of the fifth lens element with positive refractive power and the sixth lens element with negative refractive power can reduce the total length of the optical imaging system for pickup effectively, so that the image sensor can have a larger effective pixel range within the same total length. In other words, a shorter optical imaging system for pickup can be designed with the same effective pixel range of the image sensor.

If the sixth lens element has an inflection point, the inflection point can be used for guiding imaging light with an angle out from the edges of the fifth lens element, such that the imaging light at the off-axis view angle is guided to the image sensor and received by the image sensor. In addition, the optical imaging system for pickup includes at least three lens elements made of plastic to facilitate the manufacture with lower costs.

DETAILED DESCRIPTION OF THE PREFERRED EMBODIMENTS

Figure 1A:
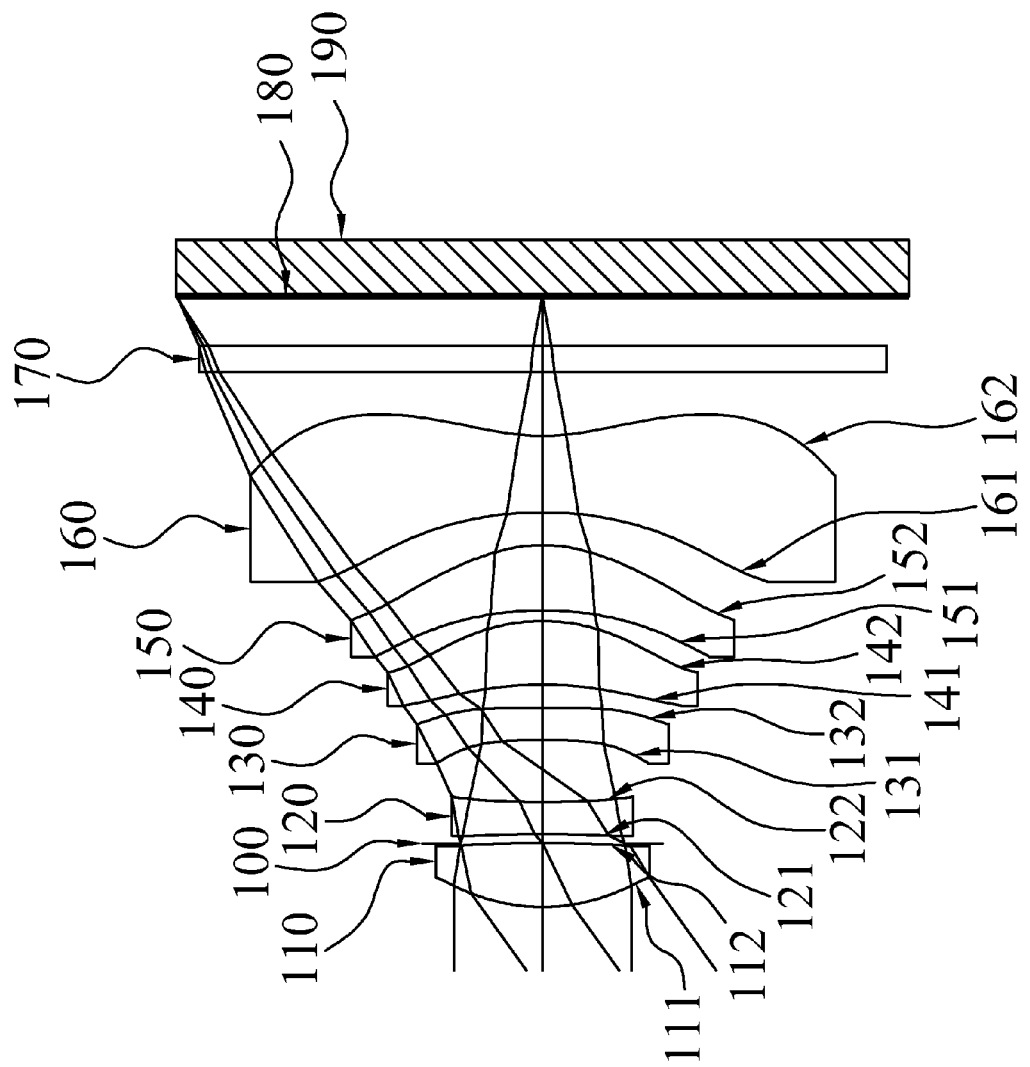
FIG. 1A is a schematic view of an optical imaging system for pickup in accordance with the first preferred embodiment of the present invention.

With reference to FIG. 1A, an optical imaging system for pickup of the present invention, sequentially arranged from an object side to an image side along an optical axis, comprises the first lens element 110, the second lens element 120, the third lens element 130, the fourth lens element 140, the fifth lens element 150 and the sixth lens element 160, wherein the first lens element 110 with positive refractive power has a convex object-side surface 111; the second lens element 120 has refractive power; the third lens element 130 has refractive power; the fourth lens element 140 has refractive power; the fifth lens element 150 has refractive power; the plastic sixth lens element 160 with refractive power has a concave image-side surface 162, and both object-side surface 161 and image-side surface 162 being aspheric, and the image-side surface 162 having at least one inflection point. The optical imaging system for pickup further comprises a stop and an IR-filter 170. More specifically, the stop can be an aperture stop 100 being a middle stop between the first lens element 110 and the second lens element 120; the IR-filter 170 is between the sixth lens element 160 and the image plane 180 and generally made of panel glass without affecting the focal length of the optical imaging system for pickup of the present invention. The optical imaging system for pickup further comprises an image sensor 190 at an image plane 180 for imaging a photographed object. The aspheric surfaces of the first lens element 110, second lens element 120, third lens element 130, fourth lens element 140, fifth lens element 150 and sixth lens element 160 comply with the aspherical surface formula as given in Equation (15).

$$X(Y) = \frac{(Y^2/R)}{1+\sqrt{(1-(1+K)(Y/R)^2)}} + \sum_{i}(A_i)\cdot(Y^i) \quad (15)$$

Wherein, X is the relative height from a point on the aspherical surface with a distance Y between the optical axis and a tangent plane at the tip of the optical axis of the aspherical surface;

Y is the distance between a point on the curve of the aspherical surface and the optical axis;

R is the curvature radius;

K is the conic coefficient; and $A_i$ is the $i^{th}$ level aspherical surface coefficient.

In the imaging system for pickup of the present invention optical, the first lens element 110, second lens element 120, third lens element 130, fourth lens element 140 and fifth lens element 150 can have spherical or aspheric surfaces. If aspheric optical surfaces are adopted, then the curvature radius of the optical surface can be used for changing the refractive power to reduce or eliminate aberrations, so as to decrease the number of lens elements used in the optical imaging system for pickup and shorten the total length of the optical imaging lens assembly effectively. The lens elements can be made of glass or plastic. If glass lens elements are adopted, the refractive power of the optical imaging system for pickup can be distributed with higher flexibility. If the plastic lens elements are adopted, the production cost can be lowered. With the arrangement of the first lens element 110, second lens element 120, third lens element 130, fourth lens element 140, fifth lens element 150 and sixth lens element 160, the optical imaging system for pickup satisfies the relation (1).

In the optical imaging system for pickup of the present invention, the positive refractive power is mainly provided by the first lens element 110 and the fifth lens element 150, such that if the relation (1) is satisfied, the ratios among the focal length $f_5$ of the fifth lens element 150, the focal length $f_6$ of the sixth lens element 160 and the focal length f of the optical imaging system for pickup can allocate the refractive power required by the fifth lens element 150 of the optical imaging system for pickup to reduce the sensitivity of the system in manufacturing tolerance and provide the required appropriate positive refractive power. In the meantime, the refractive power of the sixth lens element 160 can be adjusted to be complementary with the refractive power of the fifth lens element 150 to produce the telecentric effect, so as to facilitate reducing the rear focal length and the total length and achieve a compact optical imaging system for pickup.

If the ratio of the focal length $f_1$ of the first lens element 110 and the focal length f of the optical imaging system for pickup is limited according to the relation (8), the positive refractive power of the first lens element 110 can be adjusted appropriately to further adjust the focal length and reduce the total length of the system. When the relation (13) is satisfied, the sixth lens element 160 has a concave image-side surface 162, such that the principal point is far away from the image plane 180 to facilitate reducing the total length of the optical lens system.

If the relation (4) is satisfied, the total length of the optical imaging system for pickup can be reduced effectively, such that a larger effective pixel range of the image sensor can be achieved with the same total length. Similarly, if the relation (2) is satisfied, the position of the stop and the distance between the first lens element 110 and the sixth lens element 160 can be adjusted appropriately to shorten the length of the optical imaging system for pickup. If the total length of the optical imaging system for pickup is limited according to the relation (11), the system can have an appropriate total length. If the total length is too short, the length of each lens element must be designed with a smaller thickness. As a result, the yield rate of the manufactured lens elements would be relatively low, and the level of difficulty for the assembling process becomes higher.

Furthermore, if the relation (3) is satisfied, the focal length f of the optical imaging system for pickup can adjust the thickness of the third lens element 130, fourth lens element 140, and fifth lens element 150 to facilitate shortening the total length of the optical imaging system for pickup and enhancing the yield rate in the manufacturing process. If the ratio of the axial distance $T_{12}$ between the first lens element 110 and the second lens element 120 to the axial distance $T_{23}$ between the second lens element 120 and the third lens element 130 is limited according to the relation (14), an appropriate refractive angle of the light passing through the first lens element 110 and the air gap into the third lens element 130 can shorten the total length.

If the curvature radius $R_{11}$ of the object-side surface 161 and the curvature radius $R_{12}$ of the image-side surface 162 of the sixth lens element 160 are limited according to the relation (10), the variation of the surface shape of the sixth lens element 160 will be limited. Such arrangement can assist the aberration correction of the system and facilitate allocating the refractive power of the sixth lens element 160 to compensate the positive refractive power of the fifth lens element 150 to produce the telecentric effect. In addition, the fourth lens element 140 has a convex image-side surface 142, such that if the ratio of the curvature radii of the object-side surface 141 and the image-side surface 142 is limited according to the relation (5), the refractive power of the fourth lens element 140 can be adjusted appropriately to lower the sensitivity of the system in manufacturing tolerance, enhance the yield rate and lower the production cost. The meniscus fourth lens element 140 has a concave object-side surface 141 and a convex image-side surface 142 to provide the aberration correction function. Similarly, if the relation (6) is satisfied, the change of the surface shape of the second lens element 120 is limited to achieve the aberration correction function of the second lens element 120 with negative refractive power.

If the relation (9) is satisfied, the difference between the Abbe number $v_1$ of the first lens element 110 and the Abbe number $v_2$ of the second lens element 120 is limited within an appropriate range to effectively correct the chromatic aberrations produced by the first lens element 110 and the second lens element 120, so as to enhance the chromatic aberration correction of the second lens element 120. If the vertical distance $Y_C$ between the outermost horizontal vertex of the image side surface 162 of the sixth lens element 160 and the optical axis and the focal length f of the optical imaging system for pickup is limited according to the relation (12), the range of negative refractive power of the sixth lens element 160 is relatively larger, so as to strengthen the aberration correction at a position near the optical axis. The rear focal length of the optical imaging system for pickup can be adjusted appropriately to facilitate the reduction of the total length of the system.

The optical imaging system for pickup of the present invention is described by means of preferred embodiments with relevant drawings as follows.

First Preferred Embodiment

Figure 1B:
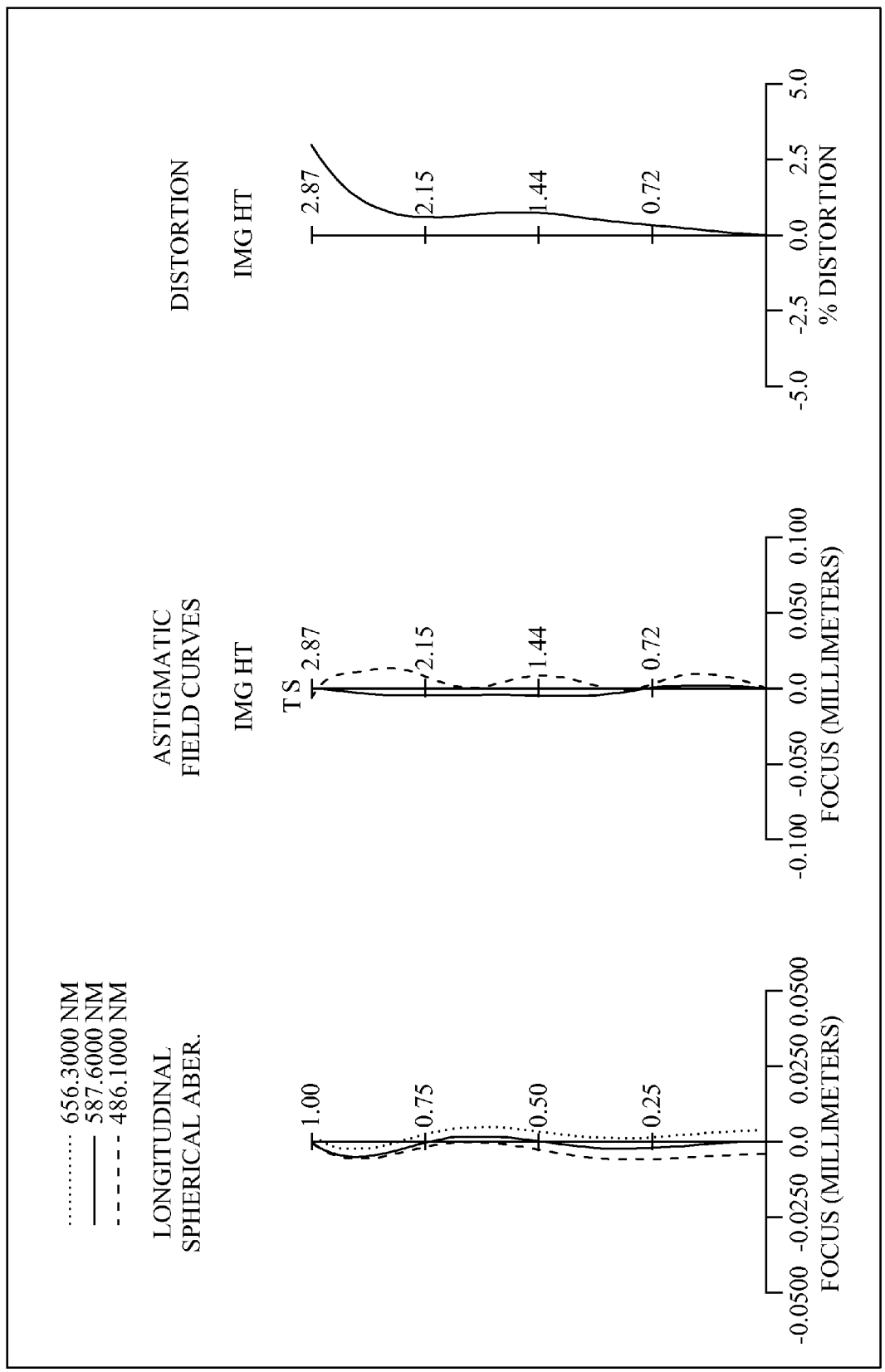
FIG. 1B is a schematic view of a series of aberration curves of the first preferred embodiment of the present invention.

With reference to FIGS. 1A and 1B for a schematic view and a series of aberration curves of an optical imaging system for pickup in accordance with the first preferred embodiment of the present invention respectively, the optical imaging system for pickup comprises six lens elements, a stop and an IR-filter 170. More specifically, the stop can be an aperture stop 100, and the optical imaging system for pickup, sequentially arranged from an object side to an image side along an optical axis, comprises: the plastic first lens element 110 with positive refractive power having a convex object-side surface 111, and a convex image-side surface 112, and both object-side surface 111 and image-side surface 112 being aspheric; an aperture stop 100; the plastic second lens element 120 with negative refractive power having a concave object-side surface 121 and a concave image-side surface 122, both object-side surface 121 and image-side surface 122 being aspheric; the plastic third lens element 130 with negative refractive power having a concave object-side surface 131 and a concave image-side surface 132, and both object-side surface 131 and image-side surface 132 being aspheric; the plastic fourth lens element 140 with positive refractive power having a concave object-side surface 141, and a convex image-side surface 142, and both object-side surface 141 and image-side surface 142 being aspheric; the plastic fifth lens element 150 with positive refractive power having a concave object-side surface 151 and a convex image-side surface 152, and both object-side surface 151 and image-side surface 152 being aspheric; the plastic sixth lens element 160 with negative refractive power having a concave object-side surface 161 and a concave image-side surface 162, and both object-side surface 161 and image-side surface 162 being aspheric, and the image-side surface 162 having at least one inflection point; the IR-filter 170 made of panel glass for adjusting a wavelength section of the imaging light that can pass through, and an image sensor 190 at an image plane 180. With the combination of the six lens elements, the aperture stop 100 and the IR-filter 170, an image of the object can be photographed at the image sensor 190.

TABLE 1

Optical data of this preferred embodiment
f = 3.91 mm, Fno = 2.80, HFOV = 35.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.526630 (ASP) | 0.504 | Plastic | 1.535 | 56.3 | 2.53 |
| 2 | | −10.629800 (ASP) | −0.004 | | | | |
| 3 | Ape. Stop | Plano | 0.074 | | | | |
| 4 | Lens 2 | −8.657100 (ASP) | 0.250 | Plastic | 1.634 | 23.8 | −6.14 |
| 5 | | 7.147300 (ASP) | 0.487 | | | | |
| 6 | Lens 3 | −7.331600 (ASP) | 0.254 | Plastic | 1.634 | 23.8 | −11.28 |
| 7 | | 290.992300 (ASP) | 0.182 | | | | |
| 8 | Lens 4 | −2.631200 (ASP) | 0.499 | Plastic | 1.544 | 55.9 | 4.90 |
| 9 | | −1.413080 (ASP) | 0.084 | | | | |
| 10 | Lens 5 | −2.543500 (ASP) | 0.512 | Plastic | 1.544 | 55.9 | 3.41 |
| 11 | | −1.148580 (ASP) | 0.258 | | | | |
| 12 | Lens 6 | −2.701230 (ASP) | 0.600 | Plastic | 1.535 | 56.3 | −1.84 |
| 13 | | 1.666300 (ASP) | 0.500 | | | | |
| 14 | IR-filter | Plano | 0.210 | Glass | 1.517 | 64.2 | — |
| 15 | | Plano | 0.388 | | | | |
| 16 | Image | Plano | — | | | | |

Note:
Reference wavelength is 587.6 nm.
ASP stands for aspherical surfaces.

The optical data of this preferred embodiment are listed in Table 1, wherein the object-side surface and the image-side surface of the first lens element 110 to the sixth lens element 160 comply with the aspheric surface formula as given in Equation (15), and their aspheric coefficients are listed in Table 2 as follows:

TABLE 2

Aspheric coefficients of this preferred embodiment

| | Surface # | | | | | |
|---|---|---|---|---|---|---|
| | 1 | 2 | 4 | 5 | 6 | 7 |
| k = | −6.27005E+00 | 2.40641E+01 | 3.46380E+01 | −2.88534E+01 | −1.00000E+00 | −5.00000E+01 |
| A4 = | 2.22067E−01 | −8.91882E−03 | 1.11985E−02 | −5.37315E−03 | −3.07329E−01 | −1.89409E−01 |
| A6 = | −2.08448E−01 | 4.56934E−02 | 4.37210E−02 | 6.53337E−02 | −1.28671E−01 | −4.07177E−02 |
| A8 = | 2.21344E−01 | −2.30625E−01 | 2.77223E−01 | 1.29841E−01 | 3.77004E−01 | 1.31926E−01 |
| A10 = | −1.83460E−01 | 4.05257E−01 | −9.77124E−01 | −3.51259E−01 | −4.49629E−01 | −6.72614E−02 |
| A12 = | −1.77376E−03 | −5.65290E−01 | 1.42246E+00 | 4.58371E−01 | 3.49487E−01 | 2.99300E−02 |
| A14 = | −2.07420E−02 | 3.20599E−01 | −6.98996E−01 | −1.14116E−01 | | |

| | Surface # | | | | | |
|---|---|---|---|---|---|---|
| | 8 | 9 | 10 | 11 | 12 | 13 |
| k = | 3.45410E+00 | −6.84920E−01 | 9.45035E−01 | −4.86064E+00 | −4.38056E+00 | −1.00945E+01 |
| A4 = | 5.69545E−02 | 1.13192E−02 | 8.60026E−03 | −1.17314E−01 | −1.05554E−02 | −5.91758E−02 |
| A6 = | 8.04410E−02 | 1.69639E−02 | −5.77304E−03 | 1.53311E−01 | −2.53017E−02 | 1.89675E−02 |
| A8 = | −2.04985E−01 | 9.48472E−03 | −1.63354E−03 | −1.37395E−01 | 1.24249E−02 | −7.02892E−03 |
| A10 = | 2.92427E−01 | 4.45615E−03 | 3.46661E−03 | 6.89020E−02 | −9.37668E−04 | 1.64788E−03 |
| A12 = | −1.80316E−01 | | | −1.48374E−02 | −1.68168E−04 | −2.21901E−04 |
| A14 = | 4.37798E−02 | | | 8.72278E−04 | 1.06644E−05 | 1.26521E−05 |

With reference to Table 1 and FIG. 1B for an optical imaging system for pickup of this preferred embodiment, the optical imaging system for pickup has a focal length f=3.91 (mm), an f-number Fno=2.80, and a half of maximum view angle HFOV=35.5°. After the optical data of this preferred embodiment are calculated and derived, the optical imaging system for pickup satisfies related conditions as shown in Table 3, and the related symbols have been described above and thus will not be described again.

TABLE 3

Data of related relations of this preferred embodiment

| Relation | Data | Relation | Data |
|---|---|---|---|
| $v_1 - v_2$ | 32.5 | $f/f_1$ | 1.54 |
| $(CT_3 + CT_4 + CT_5)/f$ | 0.32 | $|f/f_5| + |f/f_6|$ | 3.28 |
| $T_{12}/T_{23}$ | 0.14 | $Y_C/f$ | 0.33 |
| $R_{12}/f$ | 0.43 | $S_D/T_D$ | 0.86 |
| $(R_3 + R_4)/(R_3 - R_4)$ | 0.10 | TTL [mm] | 4.73 |

TABLE 3-continued

Data of related relations of this preferred embodiment

| Relation | Data | Relation | Data |
|---|---|---|---|
| $(R_7 - R_8)/(R_7 + R_8)$ | 0.30 | TTL/ImgH | 1.65 |
| $(R_{11} + R_{12})/(R_{11} - R_{12})$ | 0.24 | | |

According to the optical data as shown in Table 1 and the series of aberration curves as shown in FIG. 1B, the optical imaging system for pickup in accordance with this preferred embodiment of the present invention provides good correction results in aspects of the longitudinal spherical aberration, astigmatic field curving, and distortion.

Second Preferred Embodiment

Figure 2A:
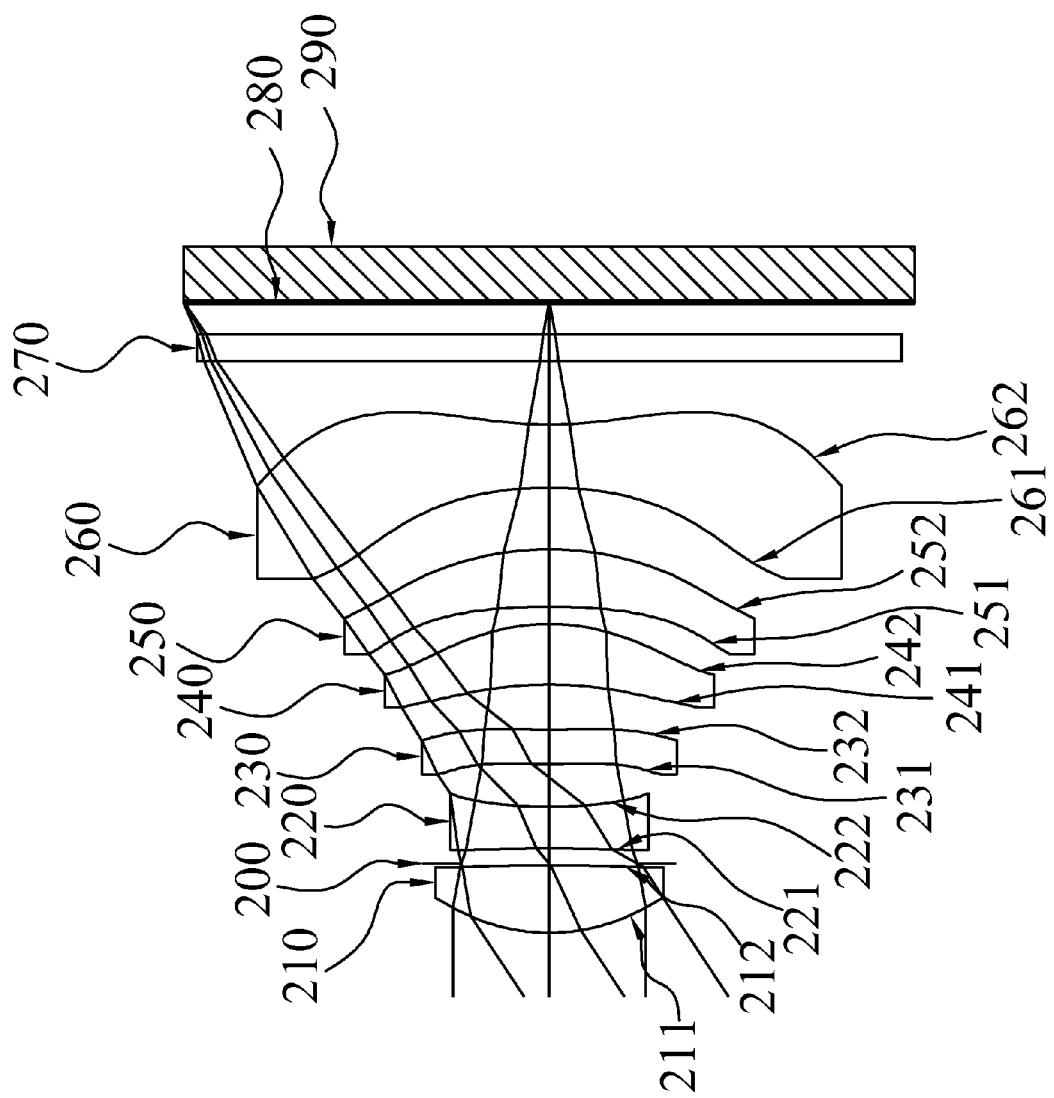
FIG. 2A is a schematic view of an optical imaging system for pickup in accordance with the second preferred embodiment of the present invention.
Figure 2B:
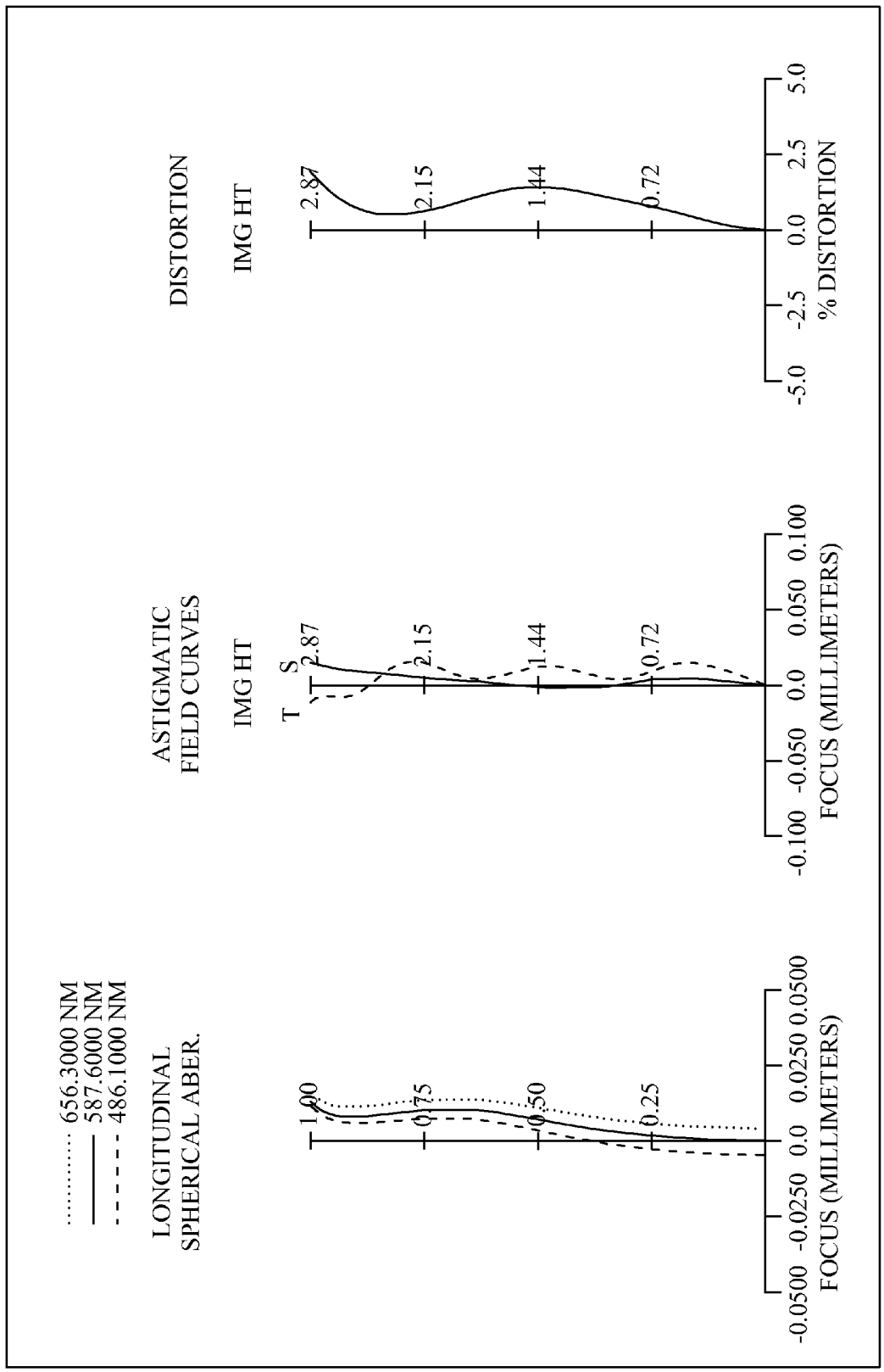
FIG. 2B is a schematic view of a series of aberration curves of the second preferred embodiment of the present invention.

With reference to FIGS. 2A and 2B for a schematic view and a series of aberration curves of an optical imaging system for pickup in accordance with the second preferred embodiment of the present invention respectively, the optical imaging system for pickup comprises six lens elements, a stop and an IR-filter 270. More specifically, the stop can be an aperture stop 200, and the optical imaging system for pickup, sequentially arranged from an object side to an image side along an optical axis, comprises: the plastic first lens element 210 with positive refractive power having a convex object-side surface 211, and a convex image-side surface 212, and both object-side surface 211 and image-side surface 212 being aspheric; an aperture stop 200; the plastic second lens element 220 with negative refractive power having a concave object-side surface 221 and a concave image-side surface 222, both object-side surface 221 and image-side surface 222 being aspheric; the plastic third lens element 230 with positive refractive power having a convex object-side surface 231 and a concave image-side surface 232, and both object-side surface 231 and image-side surface 232 being aspheric; the plastic fourth lens element 240 with positive refractive power having a concave object-side surface 241, and a convex image-side surface 242, and both object-side surface 241 and image-side surface 242 being aspheric; the plastic fifth lens element 250 with positive refractive power having a concave object-side surface 251 and a convex image-side surface 252, and both object-side surface 251 and image-side surface 252 being aspheric; the plastic sixth lens element 260 with negative refractive power having a concave object-side surface 261 and a concave image-side surface 262, and both object-side surface 261 and image-side surface 262 being aspheric, and the image-side surface 262 having at least one inflection point; an IR-filter 270 made of panel glass for adjusting a wavelength section of the imaging light that can pass through, and an image sensor 290 at an image plane 280. With the combination of the six lens elements, the aperture stop 200 and the IR-filter 270, an image of the photographed object can be formed at the image sensor 290.

TABLE 4

Optical data of this preferred embodiment
f = 4.25 mm, Fno = 2.80, HFOV = 33.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.555490 (ASP) | 0.534 | Plastic | 1.535 | 56.3 | 2.64 |
| 2 | | −13.416800 (ASP) | 0.011 | | | | |
| 3 | Ape. Stop | Plano | 0.120 | | | | |
| 4 | Lens 2 | −13.101200 (ASP) | 0.328 | Plastic | 1.634 | 23.8 | −4.22 |
| 5 | | 3.395800 (ASP) | 0.340 | | | | |
| 6 | Lens 3 | 9.543600 (ASP) | 0.270 | Plastic | 1.634 | 23.8 | 147.70 |
| 7 | | 10.510000 (ASP) | 0.355 | | | | |
| 8 | Lens 4 | −2.747300 (ASP) | 0.477 | Plastic | 1.535 | 56.3 | 6.36 |
| 9 | | −1.610980 (ASP) | 0.137 | | | | |
| 10 | Lens 5 | −5.000000 (ASP) | 0.452 | Plastic | 1.544 | 55.9 | 7.11 |
| 11 | | −2.249950 (ASP) | 0.485 | | | | |
| 12 | Lens 6 | −2.894340 (ASP) | 0.497 | Plastic | 1.535 | 56.3 | −2.66 |
| 13 | | 2.971890 (ASP) | 0.500 | | | | |
| 14 | IR-filter | Plano | 0.210 | Glass | 1.517 | 64.2 | — |
| 15 | | Plano | 0.253 | | | | |
| 16 | Image | Plano | — | | | | |

Note:
Reference wavelength is 587.6 nm.
ASP stands for aspherical surfaces.

The optical data of this preferred embodiment are listed in Table 4, wherein the object-side surface and the image-side surface of the first lens element 210 to the sixth lens element 260 comply with the aspheric surface formula as given in Equation (15), and their aspheric coefficients are listed in Table 5 as follows:

TABLE 5

Aspheric coefficients of this preferred embodiment

| | Surface # | | | | | |
|---|---|---|---|---|---|---|
| | 1 | 2 | 4 | 5 | 6 | 7 |
| k = | −7.02693E+00 | −5.00000E+01 | −2.91242E+01 | −1.89048E+01 | −1.00000E+00 | 5.00000E+01 |
| A4 = | 2.30451E−01 | 3.56828E−03 | 2.49453E−04 | 7.71823E−03 | −2.61376E−01 | −1.78309E−01 |
| A6 = | −2.01916E−01 | 5.74683E−02 | 7.51352E−02 | 1.23723E−01 | −8.06167E−02 | −4.52248E−02 |
| A8 = | 1.81867E−01 | −1.96817E−01 | 2.23108E−01 | 2.84497E−02 | 3.33982E−01 | 1.33075E−01 |
| A10 = | −8.98109E−02 | 3.85114E−01 | −1.01205E+00 | −2.93027E−01 | −4.58406E−01 | −6.17353E−02 |

TABLE 5-continued

| Aspheric coefficients of this preferred embodiment | | | | | |
|---|---|---|---|---|---|
| A12 = | 3.61373E−03 | −5.65291E−01 | 1.42246E+00 | 4.58370E−01 | 3.49487E−01 | 1.20681E−02 |
| A14 = | −2.07423E−02 | 3.20599E−01 | −6.98996E−01 | −1.14116E−01 | | |

| | Surface # | | | | | |
|---|---|---|---|---|---|---|
| | 8 | 9 | 10 | 11 | 12 | 13 |
| k = | 3.98373E+00 | −7.40958E−01 | 6.36387E+00 | −1.80338E+01 | −7.65254E−01 | −4.17313E+00 |
| A4 = | 5.12181E−02 | 2.16403E−02 | −1.71915E−02 | −1.36794E−01 | −1.80359E−02 | −7.94465E−02 |
| A6 = | 8.13768E−02 | 7.39668E−03 | −1.67151E−02 | 1.45449E−01 | −2.58288E−02 | 2.22449E−02 |
| A8 = | −1.98653E−01 | 1.96704E−03 | −3.88524E−03 | −1.38071E−01 | 1.22577E−02 | −7.07442E−03 |
| A10 = | 2.91284E−01 | 2.46722E−03 | 4.23256E−03 | 6.86861E−02 | −7.25967E−04 | 1.59073E−03 |
| A12 = | −1.86516E−01 | | | −1.48288E−02 | −1.23061E−04 | −2.22167E−04 |
| A14 = | 4.60425E−02 | | | 1.03714E−03 | −5.33604E−07 | 1.38597E−05 |

With reference to Table 4 and FIG. 2B for an optical imaging system for pickup of this preferred embodiment, the optical imaging system for pickup has a focal length f=4.25 (mm), an f-number Fno=2.80, and a half of maximum view angle HFOV=33.5°. After the optical data of this preferred embodiment are calculated and derived, the optical imaging system for pickup satisfies related conditions as shown in Table 6, and the related symbols have been described above and thus will not be described again.

TABLE 6

| Data of related relations of this preferred embodiment | | | |
|---|---|---|---|
| Relation | Data | Relation | Data |
| $v_1 - v_2$ | 32.5 | $f/f_1$ | 1.61 |
| $(CT_3 + CT_4 + CT_5)/f$ | 0.28 | $|f/f_5| + |f/f_6|$ | 2.19 |
| $T_{12}/T_{23}$ | 0.39 | $Y_c/f$ | 0.27 |
| $R_{12}/f$ | 0.70 | $S_D/T_D$ | 0.86 |
| $(R_3 + R_4)/(R_3 - R_4)$ | 0.59 | TTL [mm] | 4.90 |
| $(R_7 - R_8)/(R_7 + R_8)$ | 0.26 | TTL/ImgH | 1.71 |
| $(R_{11} + R_{12})/(R_{11} - R_{12})$ | −0.01 | | |

According to the optical data as shown in Table 4 and the series of aberration curves as shown in FIG. 2B, the optical imaging system for pickup in accordance with this preferred embodiment of the present invention provides good correction results in aspects of the longitudinal spherical aberration, astigmatic field curving, and distortion.

Third Preferred Embodiment

Figure 3A:
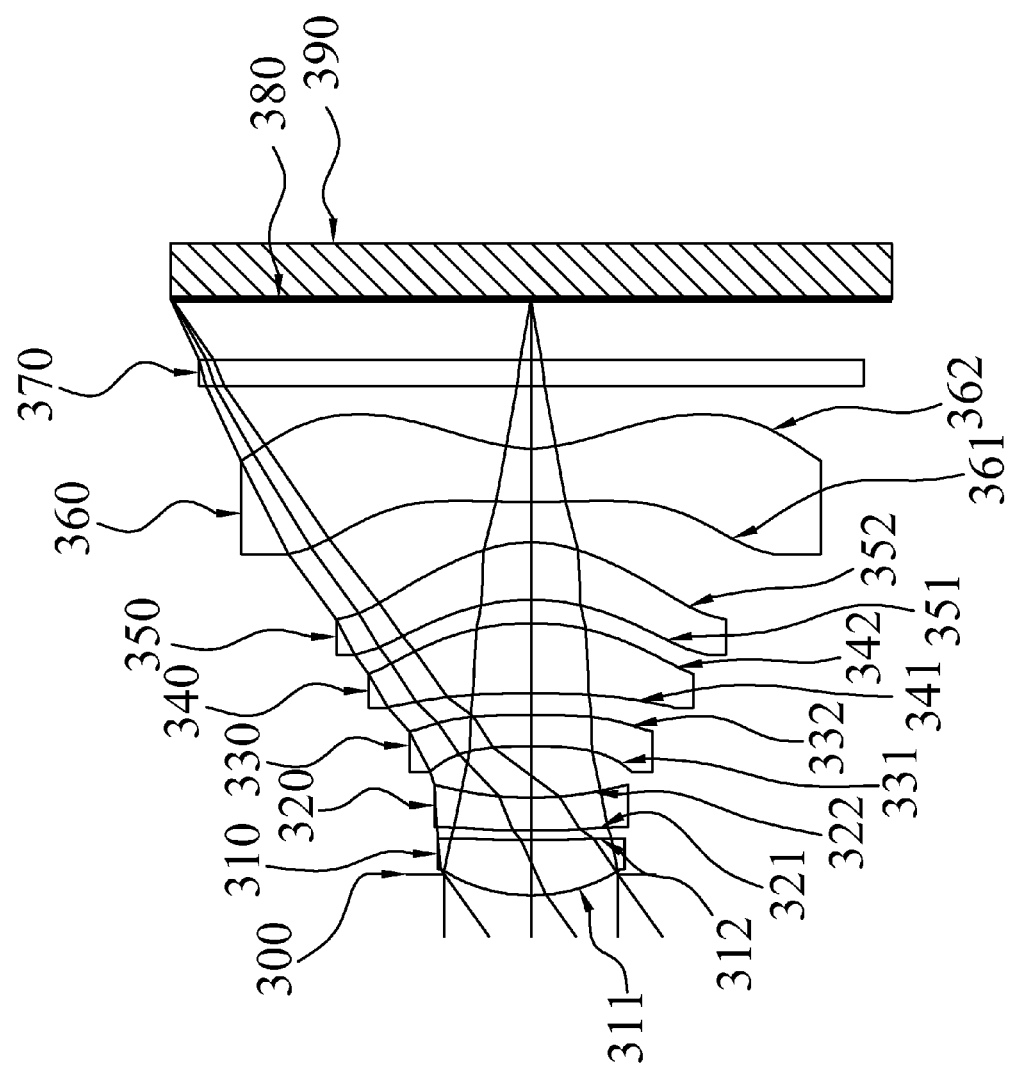
FIG. 3A is a schematic view of an optical imaging system for pickup in accordance with the third preferred embodiment of the present invention.
Figure 3B:
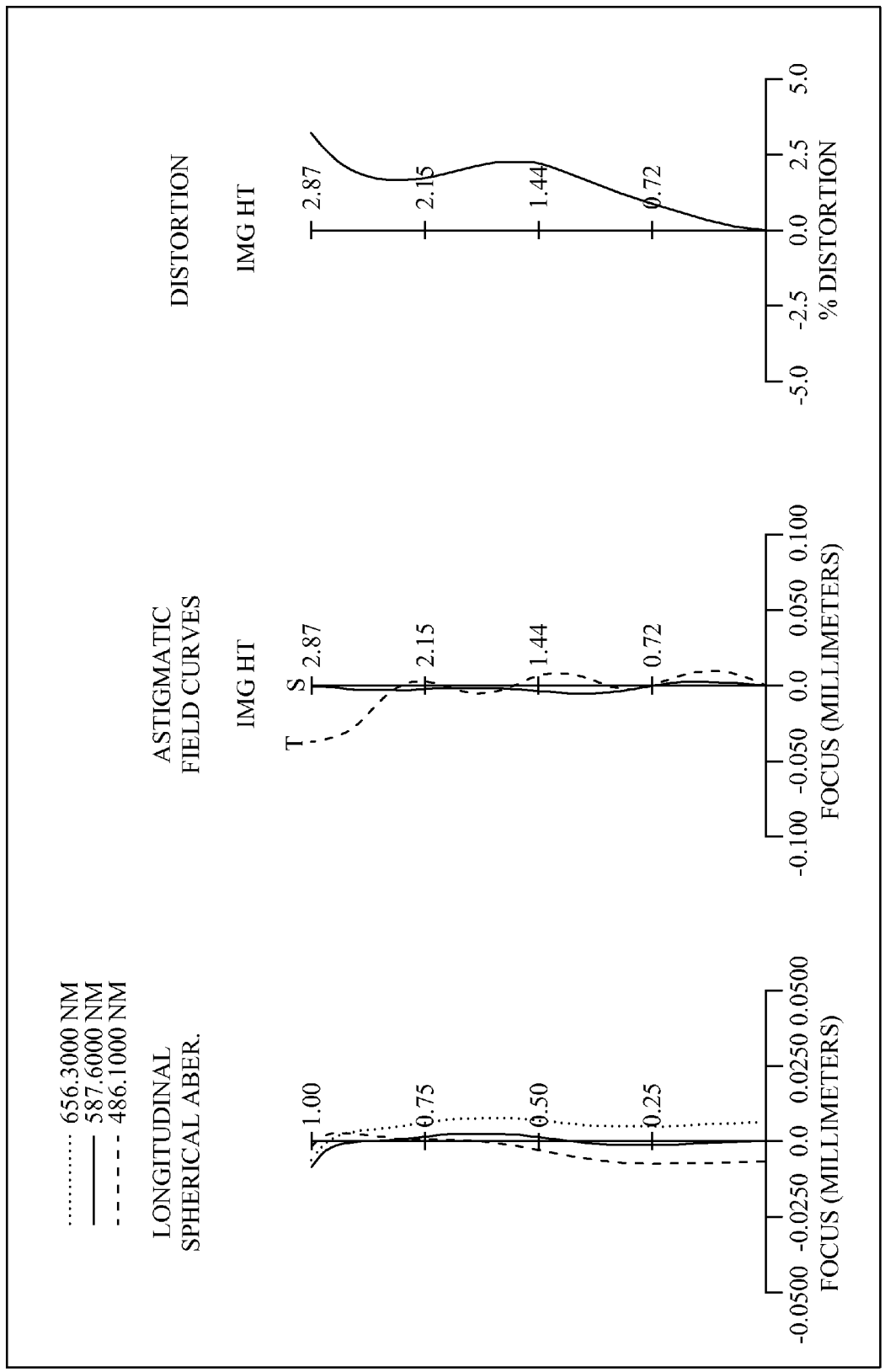
FIG. 3B is a schematic view of a series of aberration curves of the third preferred embodiment of the present invention.

With reference to FIGS. 3A and 3B for a schematic view and a series of aberration curves of an optical imaging system for pickup in accordance with the third preferred embodiment of the present invention respectively, the optical imaging system for pickup comprises six lens elements, a stop and an IR-filter 370. More specifically, the stop can be an aperture stop 300, and the optical imaging system for pickup, sequentially arranged from an object side to an image side along an optical axis, comprises: an aperture stop 300; the plastic first lens element 310 with positive refractive power having a convex object-side surface 311, and a concave image-side surface 312, and both object-side surface 311 and image-side surface 312 being aspheric; the plastic second lens element 320 with negative refractive power having a convex object-side surface 321 and a concave image-side surface 322, both object-side surface 321 and image-side surface 322 being aspheric; the plastic third lens element 330 with negative refractive power having a concave object-side surface 331 and a convex image-side surface 332, and both object-side surface 331 and image-side surface 332 being aspheric; the plastic fourth lens element 340 with positive refractive power having a concave object-side surface 341, and a convex image-side surface 342, and both object-side surface 341 and image-side surface 342 being aspheric; the plastic fifth lens element 350 with positive refractive power having a concave object-side surface 351 and a convex image-side surface 352, and both object-side surface 351 and image-side surface 352 being aspheric; the plastic sixth lens element 360 with negative refractive power having a convex object-side surface 361 and a concave image-side surface 362, and both object-side surface 361 and image-side surface 362 being aspheric, and the image-side surface 362 having at least one inflection point; an IR-filter 370 made of panel glass for adjusting a wavelength section of the imaging light that can pass through, and an image sensor 390 at an image plane 380. With the combination of the six lens elements, the aperture stop 300 and the IR-filter 370, an image of the photographed object can be formed at the image sensor 390.

TABLE 7

| Optical data of this preferred embodiment f = 3.88 mm, Fno = 2.80, HFOV = 35.6 deg. | | | | | | | |
|---|---|---|---|---|---|---|---|
| Surface # | | Curvature Radius | Thickness | Material | Index | Abbe # | Focal length |
| 0 | Object | Plano | Infinity | | | | |
| 1 | Ape. Stop | Plano | −0.170 | | | | |
| 2 | Lens 1 | 1.377280 (ASP) | 0.442 | Plastic | 1.514 | 56.8 | 2.99 |
| 3 | first lens element | 11.904800 (ASP) | 0.075 | | | | |
| 4 | Lens 2 | 5.710200 (ASP) | 0.263 | Plastic | 1.650 | 21.4 | −8.15 |
| 5 | | 2.698110 (ASP) | 0.413 | | | | |
| 6 | Lens 3 | −4.302500 (ASP) | 0.250 | Plastic | 1.634 | 23.8 | −10.06 |

TABLE 7-continued

Optical data of this preferred embodiment
f = 3.88 mm, Fno = 2.80, HFOV = 35.6 deg.

| Surface # | | Curvature Radius | Thickness | Material | Index | Abbe # | Focal length |
|---|---|---|---|---|---|---|---|
| 7 | | −13.523900 (ASP) | 0.175 | | | | |
| 8 | Lens 4 | −7.200600 (ASP) | 0.558 | Plastic | 1.544 | 55.9 | 4.91 |
| 9 | | −2.000790 (ASP) | 0.187 | | | | |
| 10 | Lens 5 | −1.670080 (ASP) | 0.459 | Plastic | 1.544 | 55.9 | 4.20 |
| 11 | | −1.058030 (ASP) | 0.325 | | | | |
| 12 | Lens 6 | 10.526300 (ASP) | 0.426 | Plastic | 1.544 | 55.9 | −2.43 |
| 13 | | 1.159080 (ASP) | 0.500 | | | | |
| 14 | IR-filter | Plano | 0.210 | Glass | 1.517 | 64.2 | — |
| 15 | | Plano | 0.483 | | | | |
| 16 | Image | Plano | — | | | | |

Note:
Reference wavelength is 587.6 nm.
ASP stands for aspherical surfaces.

The optical data of this preferred embodiment are listed in Table 7, wherein the object-side surface and the image-side surface of the first lens element 310 to the sixth lens element 360 comply with the aspheric surface formula as given in Equation (15), and their aspheric coefficients are listed in Table 8 as follows:

TABLE 8

Aspheric coefficients of this preferred embodiment

| | Surface # | | | | | |
|---|---|---|---|---|---|---|
| | 2 | 3 | 4 | 5 | 6 | 7 |
| k = | −4.94896E+00 | −1.00000E+00 | −5.00000E+01 | −1.00000E+00 | −1.00000E+00 | −5.00000E+01 |
| A4 = | 2.55745E−01 | −1.22879E−02 | −1.79634E−02 | −3.14831E−02 | −2.44690E−01 | −1.59058E−01 |
| A6 = | −1.76052E−01 | 2.74904E−02 | −2.04448E−02 | 4.75050E−02 | −1.45713E−01 | −4.49185E−02 |
| A8 = | 2.57160E−01 | −1.00248E−01 | 2.79387E−01 | 3.31342E−01 | 3.63477E−01 | 1.03680E−01 |
| A10 = | −2.10505E−01 | 1.68326E−01 | −1.10021E+00 | −3.52832E−01 | −6.95831E−01 | −6.75585E−02 |
| A12 = | 4.72163E−02 | −5.62962E−01 | 1.41611E+00 | 4.54599E−01 | 3.50965E−01 | 6.79089E−02 |
| A14 = | −2.85768E−02 | 3.20589E−01 | −6.99005E−01 | −1.14125E−01 | | |

| | Surface # | | | | | |
|---|---|---|---|---|---|---|
| | 8 | 9 | 10 | 11 | 12 | 13 |
| k = | 1.46001E+01 | −1.65555E−01 | 1.78066E−01 | −4.23181E+00 | −1.00000E+00 | −5.12007E+00 |
| A4 = | −6.04096E−03 | −1.71136E−02 | 4.05510E−02 | −1.07593E−01 | −6.85611E−02 | −7.41849E−02 |
| A6 = | 3.13490E−02 | 1.15126E−02 | 1.22064E−02 | 1.48159E−01 | −2.16414E−02 | 2.16565E−02 |
| A8 = | −2.02431E−01 | 6.06939E−03 | 3.61760E−03 | −1.38014E−01 | 1.25179E−02 | −7.19811E−03 |
| A10 = | 3.05316E−01 | 2.26058E−04 | 3.11689E−03 | 6.92804E−02 | −9.68113E−04 | 1.64156E−03 |
| A12 = | −1.77145E−01 | | | −1.45030E−02 | −1.56811E−04 | −2.15742E−04 |
| A14 = | 3.61509E−02 | | | 8.38648E−04 | 1.77748E−05 | 1.25630E−05 |

With reference to Table 7 and FIG. 3B for an optical imaging system for pickup of this preferred embodiment, the optical imaging system for pickup has a focal length f=3.88 (mm), an f-number Fno=2.80, and a half of maximum view angle HFOV=35.6°. After the optical data of this preferred embodiment are calculated and derived, the optical imaging system for pickup satisfies related conditions as shown in Table 9, and the related symbols have been described above and thus will not be described again.

TABLE 9

Data of related relations of this preferred embodiment

| Relation | Data | Relation | Data |
|---|---|---|---|
| $v_1 - v_2$ | 35.4 | $f/f_1$ | 1.30 |
| $(CT_3 + CT_4 + CT_5)/f$ | 0.33 | $|f/f_5| + |f/f_6|$ | 2.52 |
| $T_{12}/T_{23}$ | 0.18 | $Y_C/f$ | 0.35 |
| $R_{12}/f$ | 0.30 | $S_D/T_D$ | 0.95 |
| $(R_3 + R_4)/(R_3 - R_4)$ | 2.79 | TTL [mm] | 4.69 |
| $(R_7 - R_8)/(R_7 + R_8)$ | 0.57 | TTL/ImgH | 1.64 |
| $(R_{11} + R_{12})/(R_{11} - R_{12})$ | 1.25 | | |

According to the optical data as shown in Table 7 and the series of aberration curves as shown in FIG. 3B, the optical imaging system for pickup in accordance with this preferred embodiment of the present invention provides good correction results in aspects of the longitudinal spherical aberration, astigmatic field curving, and distortion.

Fourth Preferred Embodiment

Figure 4A:
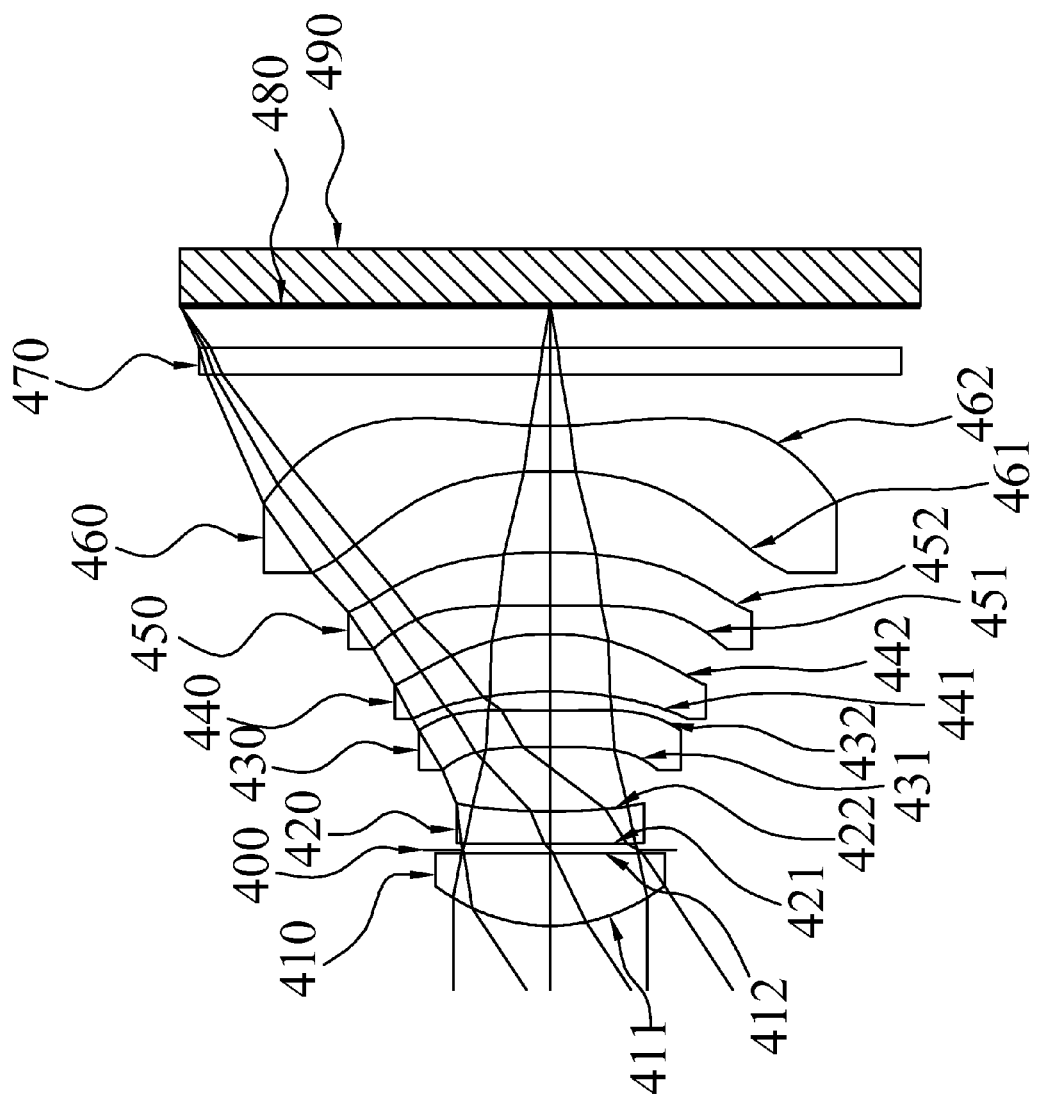
FIG. 4A is a schematic view of an optical imaging system for pickup in accordance with the fourth preferred embodiment of the present invention.
Figure 4B:
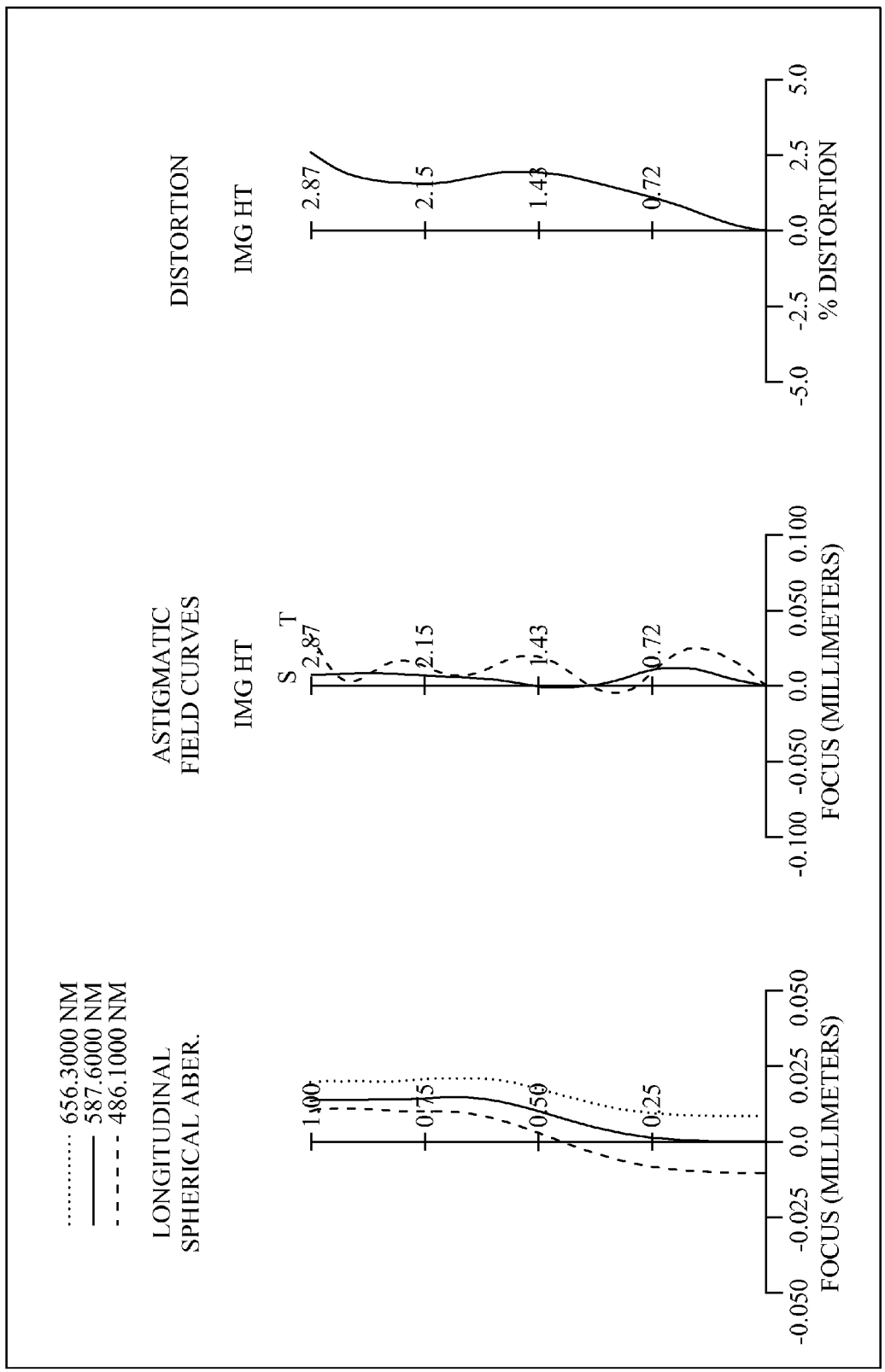
FIG. 4B is a schematic view of a series of aberration curves of the fourth preferred embodiment of the present invention.

With reference to FIGS. 4A and 4B for a schematic view and a series of aberration curves of an optical imaging system for pickup in accordance with the fourth preferred embodiment of the present invention respectively, the optical imaging system for pickup comprises six lens elements, a stop and an IR-filter 470. More specifically, the stop can be an aperture stop 400, and the optical imaging system for pickup, sequentially arranged from an object side to an image side along an optical axis, comprises: the plastic first lens element 410 with positive refractive power having a convex object-side surface 411, and a concave image-side surface 412, and both object-side surface 411 and image-side surface 412 being aspheric; an aperture stop 400; the plastic second lens element 420 with negative refractive power having a concave object-side surface 421 and a concave image-side surface 422, both object-side surface 421 and image-side surface 422 being aspheric; the plastic third lens element 430 with negative refractive power having a concave object-side surface 431 and a concave image-side surface 432, and both object-side surface 431 and image-side surface 432 being aspheric; the plastic fourth lens element 440 with positive refractive power having a concave object-side surface 441, and a convex image-side surface 442, and both object-side surface 441 and image-side surface 442 being aspheric; the plastic fifth lens element 450 with positive refractive power having a convex object-side surface 451 and a convex image-side surface 452, and both object-side surface 451 and image-side surface 452 being aspheric; the plastic sixth lens element 460 with negative refractive power having a concave object-side surface 461 and a concave image-side surface 462, and both object-side surface 461 and image-side surface 462 being aspheric, and the image-side surface 462 having at least one inflection point; an IR-filter 470 made of panel glass for adjusting a wavelength section of the imaging light that can pass through, and an image sensor 490 at an image plane 480. With the combination of the six lens elements, the aperture stop 400 and the IR-filter 470, an image of the object to be photographed can be formed at the image sensor 490.

TABLE 10

Optical data of this preferred embodiment
f = 4.22 mm, Fno = 2.80, HFOV = 33.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.413570 (ASP) | 0.565 | Plastic | 1.514 | 56.8 | 2.79 |
| 2 | | 85.858700 (ASP) | 0.024 | | | | |
| 3 | Ape. Stop | Plano | 0.051 | | | | |
| 4 | Lens 2 | −36.468000 (ASP) | 0.250 | Plastic | 1.650 | 21.4 | −7.66 |
| 5 | | 5.781700 (ASP) | 0.500 | | | | |
| 6 | Lens 3 | −17.860200 (ASP) | 0.281 | Plastic | 1.634 | 23.8 | −9.19 |
| 7 | | 8.693400 (ASP) | 0.150 | | | | |
| 8 | Lens 4 | −2.636290 (ASP) | 0.447 | Plastic | 1.535 | 56.3 | 9.53 |
| 9 | | −1.840020 (ASP) | 0.220 | | | | |
| 10 | Lens 5 | 500.000000 (ASP) | 0.414 | Plastic | 1.607 | 26.6 | 5.79 |
| 11 | | −3.541500 (ASP) | 0.631 | | | | |
| 12 | Lens 6 | −3.123500 (ASP) | 0.350 | Plastic | 1.535 | 56.3 | −3.06 |
| 13 | | 3.577900 (ASP) | 0.400 | | | | |
| 14 | IR-filter | Plano | 0.210 | Glass | 1.517 | 64.2 | — |
| 15 | | Plano | 0.323 | | | | |
| 16 | Image | Plano | — | | | | |

Note:
Reference wavelength is 587.6 nm.
ASP stands for aspherical surfaces.

The optical data of this preferred embodiment are listed in Table 10, wherein the object-side surface and the image-side surface of the first lens element 410 to the sixth lens element 460 comply with the aspheric surface formula as given in Equation (15), and their aspheric coefficients are listed in Table 11 as follows:

TABLE 11

Aspheric coefficients of this preferred embodiment

| | Surface # | | | | | |
|---|---|---|---|---|---|---|
| | 1 | 2 | 4 | 5 | 6 | 7 |
| k = | −5.56244E+00 | −1.00000E+00 | −1.00000E+00 | −1.00000E+00 | −1.00000E+00 | −2.00000E+01 |
| A4 = | 2.47866E−01 | −1.71073E−02 | 8.07736E−03 | 1.49833E−02 | −2.89736E−01 | −1.85178E−01 |
| A6 = | −2.08873E−01 | 5.08254E−02 | 3.15479E−02 | 6.37134E−02 | −1.25664E−01 | −5.07734E−02 |
| A8 = | 2.34631E−01 | −1.78675E−01 | 3.11035E−01 | 1.15615E−01 | 3.38802E−01 | 7.28808E−02 |
| A10 = | −1.94352E−01 | 4.02793E−01 | −9.86554E−01 | −3.31940E−01 | −5.96517E−01 | −8.45399E−02 |
| A12 = | 7.27048E−02 | −5.62451E−01 | 1.41570E+00 | 4.54146E−01 | 3.51936E−01 | 4.94729E−02 |
| A14 = | −2.80062E−02 | 3.18694E−01 | −6.99918E−01 | −1.14217E−01 | | |

TABLE 11-continued

Aspheric coefficients of this preferred embodiment

| Surface # | | | | | |
|---|---|---|---|---|---|
| 8 | 9 | 10 | 11 | 12 | 13 |
| k = 3.92655E+00 | 9.50269E−02 | −1.00000E+01 | −7.06168E+01 | −1.00000E+00 | −1.08280E−01 |
| A4 = 9.30871E−02 | −2.29546E−02 | −7.81893E−02 | −1.35949E−01 | −4.60189E−02 | −9.53831E−02 |
| A6 = 4.84084E−03 | 1.69538E−02 | −1.11802E−02 | 1.35294E−01 | −1.93407E−02 | 2.10887E−02 |
| A8 = −2.15180E−01 | 1.30017E−02 | −1.06410E−02 | −1.37421E−01 | 1.24675E−02 | −6.20149E−03 |
| A10 = 3.16061E−01 | −4.11645E−04 | 6.21482E−03 | 6.85949E−02 | −1.01039E−03 | 1.51834E−03 |
| A12 = −1.76301E−01 | | | −1.46444E−02 | −1.53119E−04 | −2.39953E−04 |
| A14 = 3.99882E−02 | | | 1.07415E−03 | 1.50385E−05 | 1.58284E−05 |

With reference to Table 10 and FIG. 4B for an optical imaging system for pickup of this preferred embodiment, the optical imaging system for pickup has a focal length f=4.22 (mm), an f-number Fno=2.80, and a half of maximum view angle HFOV=33.5°. After the optical data of this preferred embodiment are calculated and derived, the optical imaging system for pickup satisfies related conditions as shown in Table 12 below, and the related symbols have been described above and thus will not be described again.

TABLE 12

Data of related relations of this preferred embodiment

| Relation | Data | Relation | Data |
|---|---|---|---|
| $v_1 - v_2$ | 35.4 | $f/f_1$ | 1.51 |
| $(CT_3 + CT_4 + CT_5)/f$ | 0.27 | $|f/f_5| + |f/f_6|$ | 2.11 |
| $T_{12}/T_{23}$ | 0.15 | $Y_C/f$ | 0.24 |
| $R_{12}/f$ | 0.85 | $S_D/T_D$ | 0.85 |
| $(R_3 + R_4)/(R_3 - R_4)$ | 0.73 | TTL [mm] | 4.74 |
| $(R_7 - R_8)/(R_7 + R_8)$ | 0.18 | TTL/ImgH | 1.65 |
| $(R_{11} + R_{12})/(R_{11} - R_{12})$ | −0.07 | | |

According to the optical data as shown in Table 10 and the series of aberration curves as shown in FIG. 4B, the optical imaging system for pickup in accordance with this preferred embodiment of the present invention provides good correction results in aspects of the longitudinal spherical aberration, astigmatic field curving, and distortion.

Fifth Preferred Embodiment

Figure 5A:
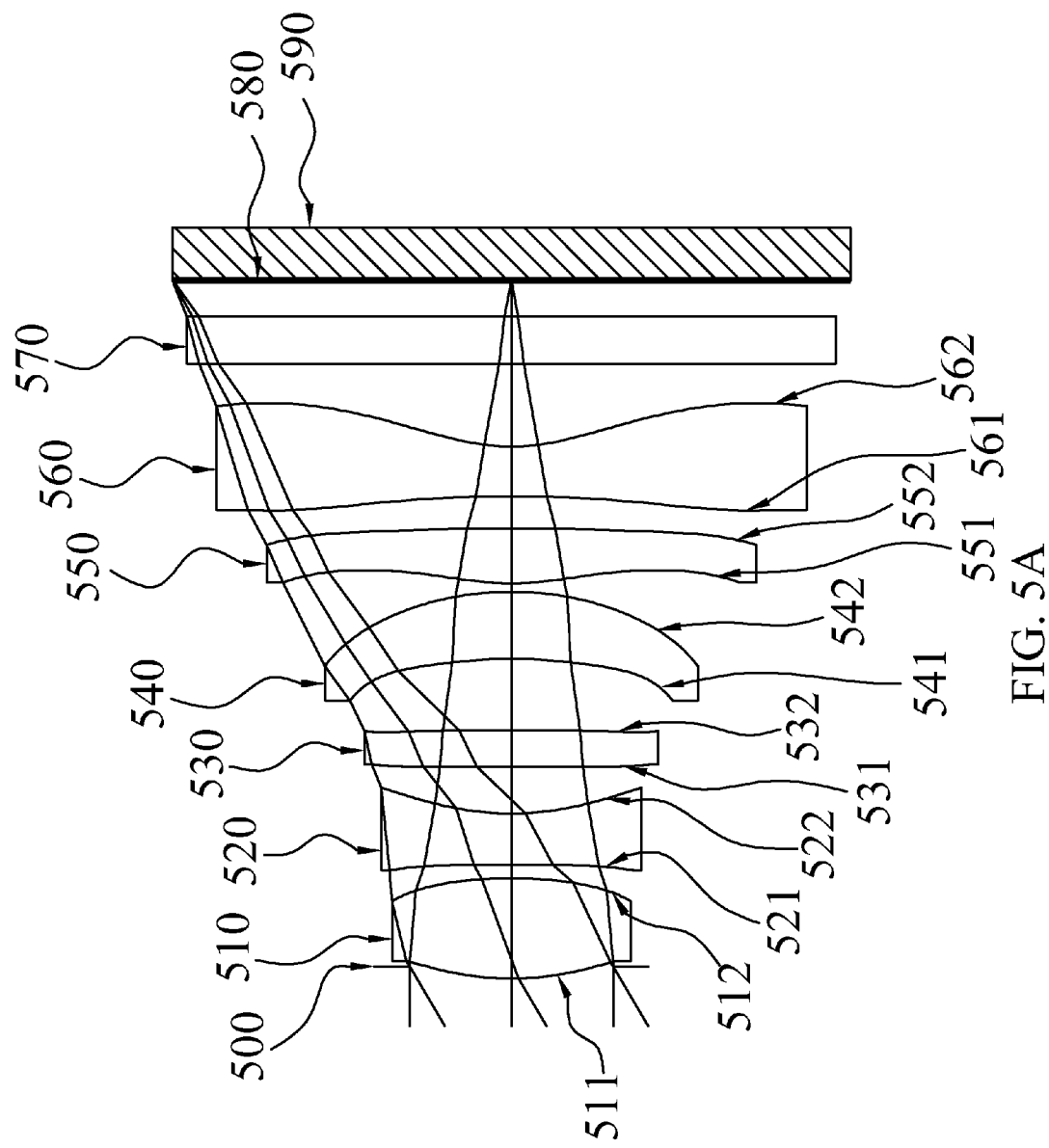
FIG. 5A is a schematic view of an optical imaging system for pickup in accordance with the fifth preferred embodiment of the present invention.
Figure 5B:
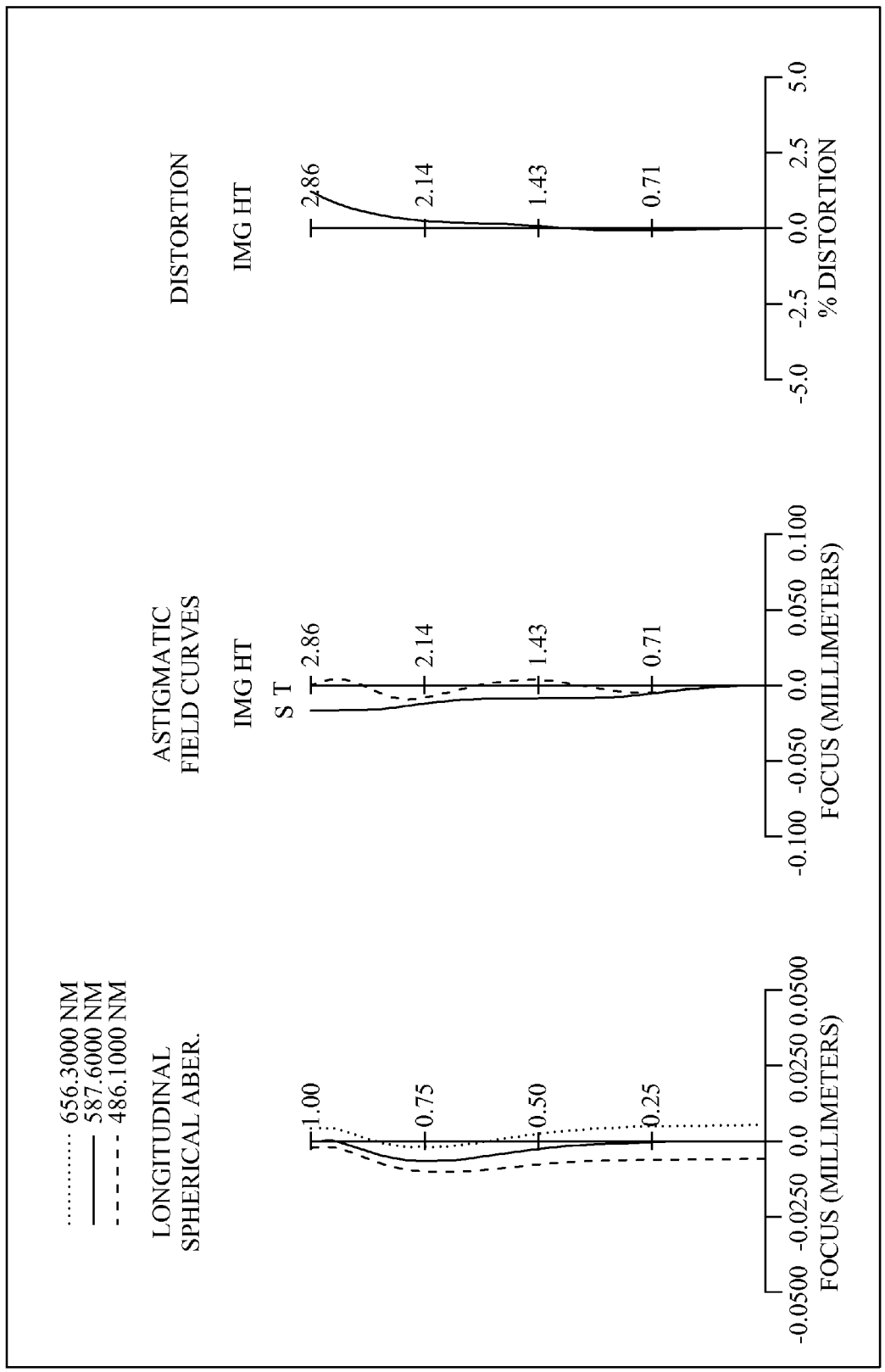
FIG. 5B is a schematic view of a series of aberration curves of the fifth preferred embodiment of the present invention.

With reference to FIGS. 5A and 5B for a schematic view and a series of aberration curves of an optical imaging system for pickup in accordance with the fifth preferred embodiment of the present invention respectively, the optical imaging system for pickup comprises six lens elements, a stop and an IR-filter 570. More specifically, the stop can be an aperture stop 500, and the optical imaging system for pickup, sequentially arranged from an object side to an image side along an optical axis, comprises: an aperture stop 500, the plastic first lens element 510 with positive refractive power having a convex object-side surface 511, and a convex image-side surface 512, and both object-side surface 511 and image-side surface 512 being aspheric; the plastic second lens element 520 with negative refractive power having a concave object-side surface 521 and a concave image-side surface 522, both object-side surface 521 and image-side surface 522 being aspheric; the plastic third lens element 530 with positive refractive power having a convex object-side surface 531 and a convex image-side surface 532, and both object-side surface 531 and image-side surface 532 being aspheric; the plastic fourth lens element 540 with positive refractive power having a concave object-side surface 541, and a convex image-side surface 542, and both object-side surface 541 and image-side surface 542 being aspheric; the plastic fifth lens element 550 with positive refractive power having a convex object-side surface 551 and a convex image-side surface 552, and both object-side surface 551 and image-side surface 552 being aspheric; the plastic sixth lens element 560 with negative refractive power having a concave object-side surface 561 and a concave image-side surface 562, and both object-side surface 561 and image-side surface 562 being aspheric, and the image-side surface 562 having at least one inflection point; an IR-filter 570 made of panel glass for adjusting a wavelength section of the imaging light that can pass through, and an image sensor 590 at an image plane 580. With the combination of the six lens elements, the aperture stop 500 and the IR-filter 570, an image of the object to be photographed can be formed at the image sensor 590.

TABLE 13

Optical data of this preferred embodiment
f = 4.80 mm, Fno = 2.80, HFOV = 30.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.100 | | | | |
| 2 | Lens 1 | 2.403880 (ASP) | 0.848 | Plastic | 1.514 | 56.8 | 2.92 |
| 3 | | −3.497700 (ASP) | 0.110 | | | | |
| 4 | Lens 2 | −2787.211900 (ASP) | 0.436 | Plastic | 1.607 | 26.6 | −4.01 |
| 5 | | 2.438760 (ASP) | 0.394 | | | | |

TABLE 13-continued

Optical data of this preferred embodiment
f = 4.80 mm, Fno = 2.80, HFOV = 30.5 deg.

| Surface # | | Curvature Radius | Thickness | Material | Index | Abbe # | Focal length |
|---|---|---|---|---|---|---|---|
| 6 | Lens 3 | 304.487300 (ASP) | 0.307 | Plastic | 1.614 | 25.6 | 72.38 |
| 7 | | −52.037200 (ASP) | 0.605 | | | | |
| 8 | Lens 4 | −3.001200 (ASP) | 0.563 | Plastic | 1.530 | 55.8 | 31.21 |
| 9 | | −2.705390 (ASP) | 0.070 | | | | |
| 10 | Lens 5 | 2.131960 (ASP) | 0.466 | Plastic | 1.530 | 55.8 | 3.70 |
| 11 | | −22.727300 (ASP) | 0.270 | | | | |
| 12 | Lens 6 | −11.231800 (ASP) | 0.420 | Plastic | 1.530 | 55.8 | −2.66 |
| 13 | | 1.632380 (ASP) | 0.700 | | | | |
| 14 | IR-filter | Plano | 0.400 | Glass | 1.517 | 64.2 | — |
| 15 | | Plano | 0.303 | | | | |
| 16 | Image | Plano | — | | | | |

Note:
Reference wavelength is 587.6 nm.
ASP stands for aspherical surfaces.

The optical data of this preferred embodiment are listed in Table 13, wherein the object-side surface and the image-side surface of the first lens element 510 to the sixth lens element 560 comply with the aspheric surface formula as given in Equation (15), and their aspheric coefficients are listed in Table 14 as follows:

TABLE 14

Aspheric coefficients of this preferred embodiment

| | Surface # | | | | | |
|---|---|---|---|---|---|---|
| | 2 | 3 | 4 | 5 | 6 | 7 |
| k = | −9.33720E−01 | −1.56254E+01 | 6.10000E+01 | −2.56256E+00 | −9.20000E+01 | −1.00000E+00 |
| A4 = | −8.06175E−03 | −3.50729E−02 | −1.34569E−02 | −3.32568E−03 | −2.67191E−03 | 1.18409E−02 |
| A6 = | −1.22665E−02 | −4.88209E−02 | −4.37759E−02 | 2.69532E−03 | 6.28878E−03 | −4.05675E−02 |
| A8 = | −3.53590E−03 | 6.95046E−03 | −8.40070E−03 | −1.33094E−02 | 2.62007E−03 | 3.72133E−02 |
| A10 = | −1.41650E−02 | −2.46406E−04 | 2.88941E−02 | 6.31942E−03 | −1.07863E−03 | −1.69236E−02 |
| A12 = | | | −3.56386E−03 | | | 5.05519E−03 |

| | Surface # | | | | | |
|---|---|---|---|---|---|---|
| | 8 | 9 | 10 | 11 | 12 | 13 |
| k = | −4.79946E+01 | 8.70768E−01 | −1.48994E+01 | −1.00000E+00 | −4.70000E+01 | −5.88041E+00 |
| A4 = | 1.53327E−02 | −1.32637E−02 | −6.73656E−02 | −3.79305E−04 | −5.81894E−03 | −2.87431E−02 |
| A6 = | −4.63194E−02 | 1.51928E−02 | 1.93738E−02 | 3.96015E−03 | 2.24230E−03 | 4.19953E−03 |
| A8 = | 1.47455E−02 | −5.33053E−03 | −6.76759E−04 | −1.83527E−03 | −7.73374E−05 | −2.97559E−04 |
| A10 = | −6.50598E−03 | −4.42414E−04 | −9.49684E−04 | 1.70888E−04 | −8.49537E−06 | −3.80301E−06 |
| A12 = | −6.78558E−05 | 1.47507E−04 | 1.24320E−04 | 3.33773E−06 | −3.51282E−07 | 2.04502E−06 |
| A14 = | | | 3.22460E−06 | | −2.17803E−08 | −1.09259E−07 |

With reference to Table 13 and FIG. 5B for an optical imaging system for pickup of this preferred embodiment, the optical imaging system for pickup has a focal length f=4.80 (mm), an f-number Fno=2.80, and a half of maximum view angle HFOV=30.5°. After the optical data of this preferred embodiment are calculated and derived, the optical imaging system for pickup satisfies related conditions as shown in Table 15, and the related symbols have been described above and thus will not be described again.

TABLE 15

Data of related relations of this preferred embodiment

| Relation | Data | Relation | Data |
|---|---|---|---|
| $v_1 - v_2$ | 30.2 | $f/f_1$ | 1.65 |
| $(CT_3 + CT_4 + CT_5)/f$ | 0.28 | $|f/f_5| + |f/f_6|$ | 3.10 |
| $T_{12}/T_{23}$ | 0.28 | $Y_C/f$ | 0.43 |
| $R_{12}/f$ | 0.34 | $S_D/T_D$ | 0.98 |
| $(R_3 + R_4)/(R_3 - R_4)$ | 1.00 | TTL [mm] | 5.76 |

TABLE 15-continued

Data of related relations of this preferred embodiment

| Relation | Data | Relation | Data |
|---|---|---|---|
| $(R_7 - R_8)/(R_7 + R_8)$ | 0.05 | TTL/ImgH | 2.02 |
| $(R_{11} + R_{12})/(R_{11} - R_{12})$ | 0.75 | | |

According to the optical data as shown in Table 13 and the series of aberration curves as shown in FIG. 5B, the optical imaging system for pickup in accordance with this preferred embodiment of the present invention provides good correction results in aspects of the longitudinal spherical aberration, astigmatic field curving, and distortion.

Sixth Preferred Embodiment

Figure 6A:
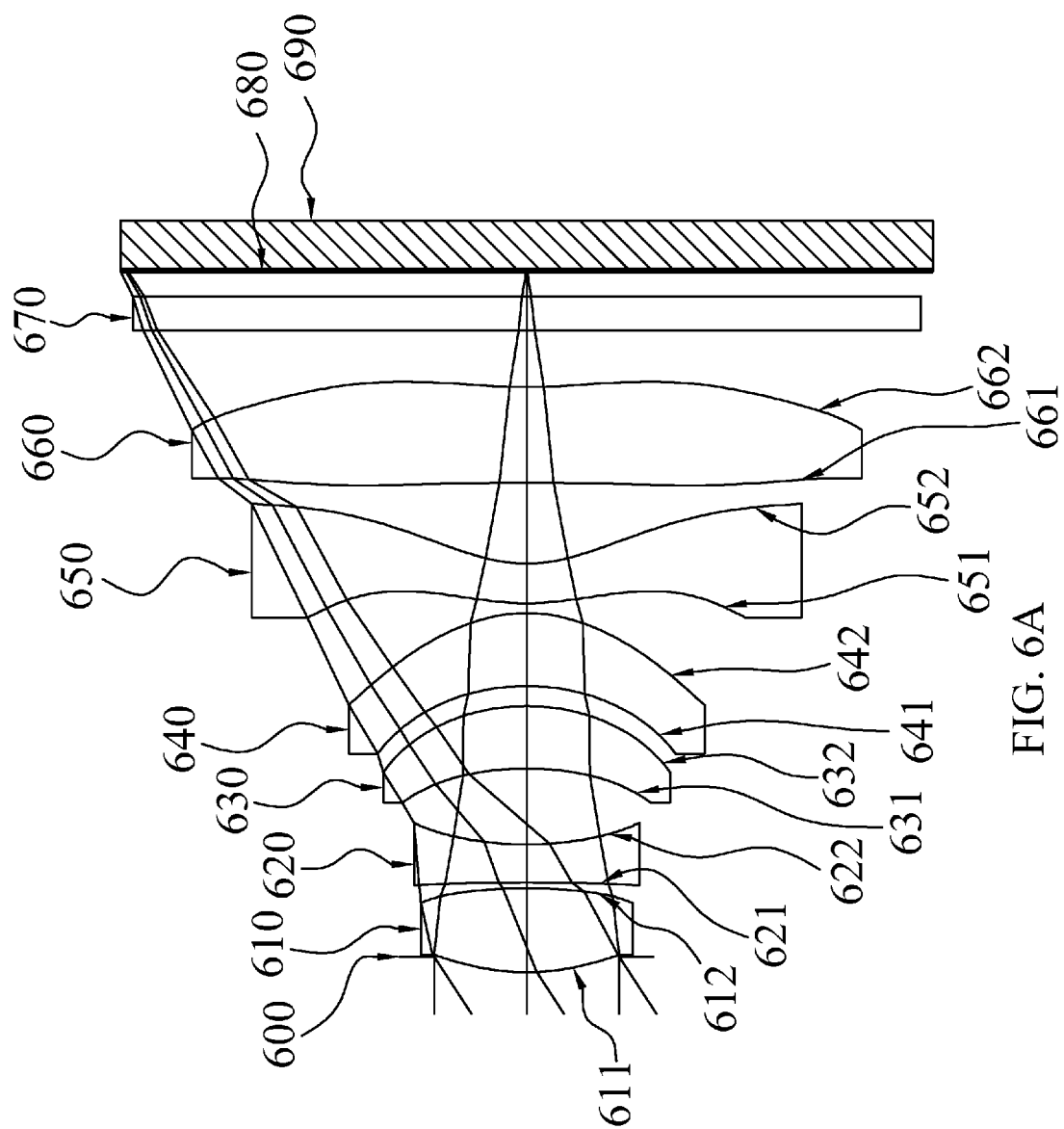
FIG. 6A is a schematic view of an optical imaging system for pickup in accordance with the sixth preferred embodiment of the present invention.
Figure 6B:
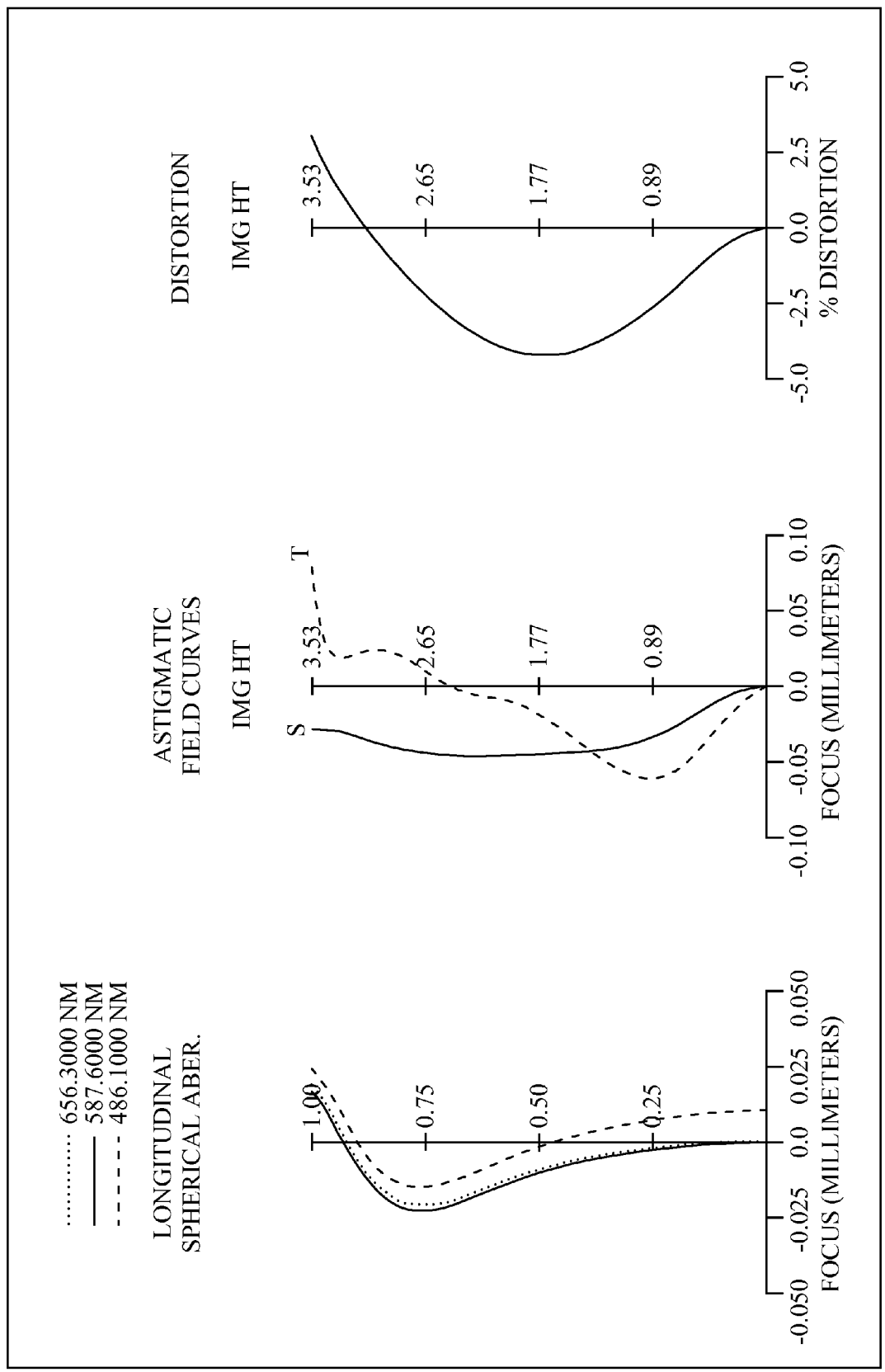
FIG. 6B is a schematic view of a series of aberration curves of the sixth preferred embodiment of the present invention.
Figure 7:
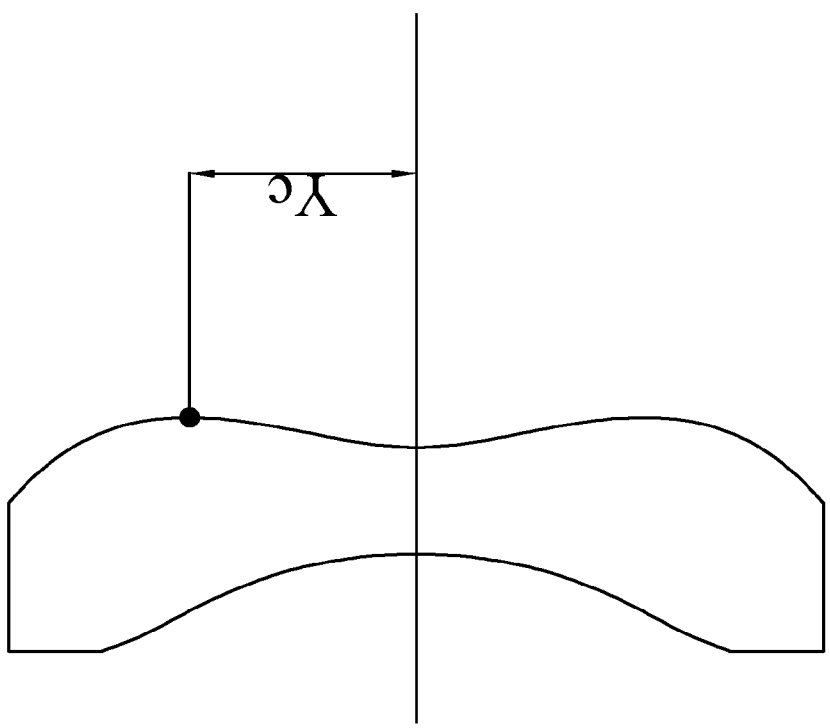
FIG. 7 is a schematic view of Yc of the present invention.

With reference to FIGS. 6A and 6B for a schematic view and a series of aberration curves of an optical imaging system for pickup in accordance with the sixth preferred embodiment of the present invention respectively, the optical imaging system for pickup comprises six lens elements, a stop and an IR-filter 670. More specifically, the stop can be an aperture stop 600, and the optical imaging system for pickup, sequentially arranged from an object side to an image side along an optical axis, comprises: an aperture stop 600; the plastic first lens element 610 with positive refractive power having a convex object-side surface 611, and a convex image-side surface 612, and both object-side surface 611 and image-side surface 612 being aspheric; the plastic second lens element 620 with negative refractive power having a concave object-side surface 621 and a concave image-side surface 622, both object-side surface 621 and image-side surface 622 being aspheric; the plastic third lens element 630 with positive refractive power having a concave object-side surface 631 and a convex image-side surface 632, and both object-side surface 631 and image-side surface 632 being aspheric; the plastic fourth lens element 640 with positive refractive power having a concave object-side surface 641, and a convex image-side surface 642, and both object-side surface 641 and image-side surface 642 being aspheric; the plastic fifth lens element 650 with negative refractive power having a convex object-side surface 651 and a concave image-side surface 652, and both object-side surface 651 and image-side surface 652 being aspheric; the plastic sixth lens element 660 with negative refractive power having a concave object-side surface 661 and a concave image-side surface 662, and both object-side surface 661 and image-side surface 662 being aspheric, and the image-side surface 662 having at least one inflection point; an IR-filter 670 made of panel glass for adjusting a wavelength section of the imaging light that can pass through, and an image sensor 690 at an image plane 680. With the combination of the six lens elements, the aperture stop 600 and the IR-filter 670, an image of the photographed object to can be formed at the image sensor 690.

TABLE 16

Optical data of this preferred embodiment
f = 5.23 mm, Fno = 3.20, HFOV = 33.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.133 | | | | |
| 2 | Lens 1 | 2.127090 (ASP) | 0.740 | Plastic | 1.543 | 56.5 | 2.77 |
| 3 | | −4.512500 (ASP) | 0.050 | | | | |
| 4 | Lens 2 | −33.100400 (ASP) | 0.337 | Plastic | 1.607 | 26.6 | −4.52 |
| 5 | | 3.003100 (ASP) | 0.669 | | | | |
| 6 | Lens 3 | −2.741420 (ASP) | 0.550 | Plastic | 1.583 | 30.2 | 8.49 |
| 7 | | −1.894860 (ASP) | 0.177 | | | | |
| 8 | Lens 4 | −1.947400 (ASP) | 0.644 | Plastic | 1.543 | 56.5 | 5.74 |
| 9 | | −1.338350 (ASP) | 0.088 | | | | |
| 10 | Lens 5 | 2.412200 (ASP) | 0.348 | Plastic | 1.633 | 23.4 | −4.59 |
| 11 | | 1.244550 (ASP) | 0.717 | | | | |
| 12 | Lens 6 | −21.654700 (ASP) | 0.842 | Plastic | 1.633 | 23.4 | −6.21 |
| 13 | | 4.869300 (ASP) | 0.500 | | | | |
| 14 | IR-filter | Plano | 0.300 | Glass | 1.517 | 64.2 | — |
| 15 | | Plano | 0.223 | | | | |
| 16 | Image | Plano | — | | | | |

Note:
Reference wavelength is 587.6 nm.
ASP stands for aspherical surfaces.

The optical data of this preferred embodiment are listed in Table 16, wherein the object-side surface and the image-side surface of the first lens element 610 to the sixth lens element 660 comply with the aspheric surface formula as given in Equation (15), and their aspheric coefficients are listed in Table 17 as follows:

TABLE 17

Aspheric coefficients of this preferred embodiment

| | Surface # | | | | | |
|---|---|---|---|---|---|---|
| | 2 | 3 | 4 | 5 | 6 | 7 |
| k = | −5.20024E−01 | −4.17568E+01 | 9.64829E+00 | −1.29601E+01 | −4.38345E+00 | 8.87301E−01 |
| A4 = | −2.28820E−03 | −4.34779E−02 | 4.16326E−03 | 5.19024E−02 | −6.71647E−02 | −5.34952E−03 |
| A6 = | −2.03356E−02 | −3.34775E−02 | −2.91330E−02 | 3.93263E−04 | −8.41760E−03 | 3.57259E−04 |
| A8 = | 1.74682E−02 | 1.09461E−02 | 1.45443E−02 | 3.30179E−03 | 1.10480E−03 | 2.15456E−03 |
| A10 = | −3.74325E−02 | −2.15462E−02 | −1.42353E−03 | 6.14962E−03 | 7.39043E−04 | 1.49800E−03 |
| A12 = | | −2.34374E−03 | −9.54292E−04 | −1.50006E−03 | 2.67525E−04 | |

| | Surface # | | | | | |
|---|---|---|---|---|---|---|
| | 8 | 9 | 10 | 11 | 12 | 13 |
| k = | 8.26271E−01 | −2.40901E+00 | −1.22871E+01 | −4.09513E+00 | −1.00000E+00 | −7.55740E+01 |
| A4 = | −7.76505E−04 | −2.44078E−02 | −5.29855E−02 | −3.63895E−02 | 5.40063E−03 | −2.48920E−02 |
| A6 = | 1.38964E−03 | −1.92131E−03 | 3.04904E−03 | 6.11537E−03 | 1.85690E−04 | 2.84633E−03 |
| A8 = | 1.05688E−03 | −1.65014E−04 | 2.85766E−03 | −5.22029E−04 | −5.47682E−05 | −1.92311E−05 |
| A10 = | 9.90431E−04 | 4.45575E−04 | −6.27859E−05 | 1.14436E−05 | 2.42222E−07 | −1.27509E−05 |
| A12 = | | 4.18688E−05 | 1.50221E−05 | 1.32732E−06 | 2.71179E−09 | 1.45397E−07 |
| A14 = | | | −1.13613E−08 | 3.15645E−09 | −2.64304E−09 | 8.21323E−09 |
| A16 = | | | −1.02245E−08 | −5.22326E−10 | 2.84532E−11 | 6.04089E−11 |

With reference to Table 16 and FIG. 6B for an optical imaging system for pickup of this preferred embodiment, the optical imaging system for pickup has a focal length f=5.23 (mm), an f-number Fno=3.20, and a half of maximum view angle HFOV=33.3°. After the optical data of this preferred embodiment are calculated and derived, the optical imaging system for pickup satisfies related conditions as shown in Table 18, and the related symbols have been described above and thus will not be described again.

TABLE 18

Data of related relations of this preferred embodiment

| Relation | Data | Relation | Data |
|---|---|---|---|
| $v_1 - v_2$ | 29.9 | $f/f_1$ | 1.89 |
| $(CT_3 + CT_4 + CT_5)/f$ | 0.30 | $|f/f_5| + |f/f_6|$ | 1.98 |
| $T_{12}/T_{23}$ | 0.07 | $Y_c/f$ | 0.21 |
| $R_{12}/f$ | 0.93 | $S_D/T_D$ | 0.97 |
| $(R_3 + R_4)/(R_3 - R_4)$ | 0.83 | TTL [mm] | 6.08 |
| $(R_7 - R_8)/(R_7 + R_8)$ | 0.19 | TTL/ImgH | 1.72 |
| $(R_{11} + R_{12})/(R_{11} - R_{12})$ | 0.63 | | |

According to the optical data as shown in Table 16 and the series of aberration curves as shown in FIG. 6B, the optical imaging system for pickup in accordance with this preferred embodiment of the present invention provides good correction results in aspects of the longitudinal spherical aberration, astigmatic field curving, and distortion.

In the optical imaging system for pickup of the present invention, if the lens element has a convex surface, then the surface of the lens element is convex at a paraxial position; and if the lens element has a concave surface, then the surface of the lens element is concave at a paraxial position.

In the optical imaging system for pickup of the present invention, at least one stop such as a glare stop or a field stop can be provided for reducing stray lights to improve the image quality, limiting the field size, or other functionalities. At least one stop can be positioned before the first lens element, between lens elements, or before the image plane within the optical imaging system for pickup depending on the preference of the optical designer. Additionally, the optical imaging system for pickup can also be utilized in 3D (three-dimensional) applications.

Tables 1 to 18 show changes of values of an optical imaging lens assembly in accordance with different preferred embodiments of the present invention respectively, and even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

What is claimed is:

1. An optical imaging system for pickup, sequentially arranged from an object side to an image side comprising:
a first lens element with positive refractive power, having a convex object-side surface;
a second lens element with negative refractive power;
a third lens element with refractive power;
a fourth lens element with refractive power;
a fifth lens element with refractive power; and
a plastic sixth lens element with negative refractive power having a concave image-side surface, both object-side surface and image-side surface being aspheric, and the image-side surface having at least one inflection point;
wherein the optical imaging system for pickup has a total of six lens elements with refractive power, and wherein f is a focal length of the optical imaging system for pickup, $f_5$ is a focal length of the fifth lens element, $f_6$ is a focal length of the sixth lens element, and the following relation is satisfied:

$$1.8 < |f/f_5| + |f/f_6| < 3.5.$$

2. The optical imaging system for pickup of claim 1, wherein the fifth lens element has positive refractive power.

3. The optical imaging system for pickup of claim 2, further comprising a stop, wherein $T_D$ is an axial distance between the object-side surface of the first lens element and the image-side surface of the sixth lens element, $S_D$ is an axial distance between the stop and the image-side surface of the sixth lens element, and the following relation is satisfied:

$$0.7 < S_D/T_D < 1.2.$$

4. The optical imaging system for pickup of claim 3, wherein f is the focal length of the optical imaging system for pickup, $CT_3$ is a central thickness of the third lens element, $CT_4$ is a central thickness of the fourth lens element, $CT_5$ is a central thickness of the fifth lens element, and the following relation is satisfied:

$$0.2<(CT_3+CT_4+CT_5)/f<0.4.$$

5. The optical imaging system for pickup of claim 3, wherein the optical imaging system for pickup comprises at least three plastic lens elements and further comprises an image sensor at an image plane for imaging an photographed object; TTL is an axial distance between the object-side surface of the first lens element and the image plane, ImgH is half of an diagonal length of an effective photosensitive area of the image sensor, and the following relation is satisfied:

$$TTL/ImgH<2.1.$$

6. The optical imaging system for pickup of claim 3, wherein $R_7$ is a curvature radius of the object-side surface of the fourth lens element, $R_8$ is a curvature radius of the image-side surface of the fourth lens element, and the following relation is satisfied:

$$0<(R_7-R_8)/(R_7+R_8)<0.6.$$

7. The optical imaging system for pickup of claim 3, wherein $R_3$ is a curvature radius of the object-side surface of the second lens element, $R_4$ is a curvature radius of the image-side surface of the second lens element, and the following relation is satisfied:

$$0<(R_3+R_4)/(R_3-R_4)<1.5.$$

8. The optical imaging system for pickup of claim 3, wherein the second lens element has a concave image-side surface, the sixth lens element has a concave object-side surface, f is the focal length of the optical imaging system for pickup, $f_5$ is the focal length of the fifth lens element, $f_6$ is the focal length of the sixth lens element, and the following relation is satisfied:

$$2.0<|f/f_5|+|f/f_6|<3.2.$$

9. The optical imaging system for pickup of claim 1, wherein f is the focal length of the optical imaging system for pickup, $f_1$ is a focal length of the first lens element, and the following relation is satisfied:

$$1.0<f/f_1<2.0.$$

10. The optical imaging system for pickup of claim 9, wherein $v_1$ is an Abbe number of the first lens element, $v_2$ is an Abbe number of the second lens element, and the following relation is satisfied:

$$25<v_1-v_2<40.$$

11. The optical imaging system for pickup of claim 10, wherein the second lens element has a concave image-side surface; the fourth lens element has a concave object-side surface and a convex image-side surface; the fifth lens element has a concave object-side surface and a convex image-side surface; the sixth lens element has a concave object-side surface.

12. The optical imaging system for pickup of claim 10, wherein $R_{11}$ is a curvature radius of the object-side surface of the sixth lens element, $R_{12}$ is a curvature radius of the image-side surface of the sixth lens element, and the following relation is satisfied:

$$-0.2<(R_{11}+R_{12})/(R_{11}-R_{12})<0.9.$$

13. The optical imaging system for pickup of claim 10, further comprising an image plane, wherein TTL is an axial distance between the object-side surface of the first lens element and the image plane, and the following relation is satisfied:

$$3.7\ mm<TTL<6.5\ mm.$$

14. The optical imaging system for pickup of claim 2, wherein $Y_C$ is a vertical distance between the outermost horizontal vertex of the image side surface of the sixth lens element and the optical axis, and f is the focal length of the optical imaging system for pickup, and the following relation is satisfied:

$$0.1<Y_C/f<0.8.$$

15. The optical imaging system for pickup of claim 14, wherein $R_{12}$ is a curvature radius of the image-side surface of the sixth lens element, f is the focal length of the optical imaging system for pickup, and the following relation is satisfied:

$$0.2<R_{12}/f<1.2.$$

16. The optical imaging system for pickup of claim 14, wherein the second lens element has a concave image-side surface, and the sixth lens element has a concave object-side surface.

17. The optical imaging system for pickup of claim 14, wherein $T_{12}$ is an axial distance between the first lens element and the second lens element, $T_{23}$ is an axial distance between the second lens element and the third lens element, and the following relation is satisfied:

$$0.03<T_{12}/T_{23}<0.3.$$

18. The optical imaging system for pickup of claim 1, further comprising an image sensor at an image plane for imaging an photographed object; wherein TTL is an axial distance between the object-side surface of the first lens element and the image plane, ImgH is half of an diagonal length of an effective photosensitive area of the image sensor, and the following relation is satisfied:

$$TTL/ImgH<2.1.$$

19. An optical imaging system for pickup, sequentially arranged from an object side to an image side comprising:
   a first lens element with positive refractive power, having a convex object-side surface;
   a second lens element with negative refractive power;
   a third lens element with refractive power;
   a fourth lens element with refractive power;
   a fifth lens element with refractive power; and
   a plastic sixth lens element with negative refractive power having a concave image-side surface, both object-side surface and image-side surface thereof being aspheric, and the image-side surface having at least one inflection point;
   wherein the optical imaging system for pickup has a total of six lens elements with refractive power, and wherein f is a focal length of the optical imaging system for pickup, $f_5$ is a focal length of the fifth lens element, $f_6$ is a focal length of the sixth lens element, and $Y_C$ is a vertical distance between the outermost horizontal vertex of the image side surface of the sixth lens element and the optical axis, and the following relations are satisfied:

$$1.8<|f/f_5|+|f/f_6|<3.5;\ and$$

$$0.1<Y_C/f<0.8.$$

20. The optical imaging system for pickup of claim 19, further comprising an image plane, wherein TTL is an axial distance between the object-side surface of the first lens element and the image plane, and the following relation is satisfied:

$3.7\ mm < TTL < 6.5\ mm.$

21. The optical imaging system for pickup of claim 19, wherein the second lens element has a concave image-side surface; the fourth lens element has a concave object-side surface and a convex image-side surface; the fifth lens element has a concave object-side surface and a convex image-side surface; and the sixth lens element has a concave object-side surface.

* * * * *